United States Patent
Schuehler et al.

(10) Patent No.: US 10,608,334 B2
(45) Date of Patent: Mar. 31, 2020

(54) ANTENNA APPARATUS SUPPORTING ADJUSTABILITY OF AN ANTENNA BEAM DIRECTION

(71) Applicant: Fraunhofer-Gesellschaft zur Foerderung der angewandten Forschung e.V., Munich (DE)

(72) Inventors: Mario Schuehler, Effeltrich (DE); Lars Weisgerber, Ebersbach-Neugersdorf (DE); Johannes Arendt, Erlangen (DE); Rainer Wansch, Baiersdorf (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 285 days.

(21) Appl. No.: 15/494,779

(22) Filed: Apr. 24, 2017

(65) Prior Publication Data
US 2017/0229774 A1     Aug. 10, 2017

Related U.S. Application Data

(63) Continuation of application No. PCT/EP2014/073158, filed on Oct. 28, 2014.

(51) Int. Cl.
*H01Q 3/24* (2006.01)
*H01Q 25/00* (2006.01)
(Continued)

(52) U.S. Cl.
CPC ............ *H01Q 3/24* (2013.01); *H01Q 25/00* (2013.01); *H04B 7/0408* (2013.01);
(Continued)

(58) Field of Classification Search
CPC .... H04B 7/0617; H04B 7/086; H04B 7/0452; H04B 7/0413; H04B 17/12; H04B 7/0408;
(Continued)

(56) References Cited

U.S. PATENT DOCUMENTS

| 5,257,031 A | 10/1993 | Scarpetta et al. |
| 6,377,783 B1 * | 4/2002 | Lo .............. H01Q 3/26 342/373 |

(Continued)

FOREIGN PATENT DOCUMENTS

| JP | S63198889 A | 8/1988 |
| JP | H04238403 A | 8/1992 |
| JP | H01156610 A | 1/1999 |

OTHER PUBLICATIONS

Baggen, L. et al., "A Compact Phased Array for SatCom Applications", Proc. of the 2013 IEEE International Symposium on Phased Array Systems & Technology, Oct. 15-18, 2013, pp. 232-239.

(Continued)

*Primary Examiner* — Olumide Ajibade Akonai
(74) *Attorney, Agent, or Firm* — Michael A. Glenn; Perkins Coie LLP

(57) ABSTRACT

A support of an adjustability of an antenna beam direction is rendered less expensive in terms of implementation by the following measure: a beam forming network switchable between fixedly preconfigured beam forming states is coupled to an antenna array via a switching network switchable between different connecting states according to which the antenna interfaces of the beam forming network are connected to the antennas so that relative positions of the antennas connected to the antenna interfaces differ among the connection states, or more than one beam forming network is provided, each switchable between fixedly preconfigured beam forming states and coupled to a respective set of antennas of an antenna array, respectively, with the beam directions of provided be the beam forming networks being mutually disjoint.

20 Claims, 24 Drawing Sheets

(51) Int. Cl.
*H04B 7/06* (2006.01)
*H04B 7/0408* (2017.01)
*H04B 7/08* (2006.01)
*H01Q 1/24* (2006.01)
*H01Q 3/26* (2006.01)

(52) U.S. Cl.
CPC ........... *H04B 7/0617* (2013.01); *H01Q 1/246* (2013.01); *H01Q 3/2605* (2013.01); *H04B 7/086* (2013.01)

(58) Field of Classification Search
CPC .... H04B 7/088; H04B 7/0695; H04B 7/0802; H01Q 1/246; H01Q 3/2605; H01Q 25/00; H01Q 3/26; H01Q 3/40; H01Q 3/24; H01Q 3/36; H01Q 21/0025; H01Q 21/06; H01Q 3/00; H01Q 3/28; H01Q 21/00; H01Q 21/061; H01Q 21/24; G01S 2013/0254; G01S 3/8034; G01S 15/8913; G01S 15/8915; G01S 15/8925
See application file for complete search history.

(56) References Cited

U.S. PATENT DOCUMENTS

| | | | | |
|---|---|---|---|---|
| 7,180,447 | B1* | 2/2007 | Jacomb-Hood | H01Q 3/24 342/373 |
| 2007/0135168 | A1* | 6/2007 | Liu | H01Q 3/40 455/562.1 |
| 2009/0009392 | A1 | 1/2009 | Jacomb-Hood et al. | |
| 2009/0322608 | A1* | 12/2009 | Adams | H01Q 1/246 342/368 |
| 2011/0109507 | A1* | 5/2011 | Warnick | H01Q 21/0025 342/368 |
| 2012/0163510 | A1* | 6/2012 | Cho | H04B 7/086 375/340 |
| 2014/0029461 | A1* | 1/2014 | Kinamon | H04B 7/0857 370/252 |
| 2015/0341098 | A1* | 11/2015 | Angeletti | H01Q 3/40 375/267 |

OTHER PUBLICATIONS

Krnan, L. et al., "Reconfigurable Digitally Scanned Polarimetric L-Band Radar", Proc. of the 2009 IEEE Radar Conference, May 4-8, 2009, 4 pages.
Nickel, U., "Array Processing for Radar: Achievements and Challenges", International Journal of Antennas and Propagation, Jul. 2013, pp. 1-22.
Nickel, U., "Subarray Configurations for Digital Beamforming with Low Sidelobes and Adaptive Interference Suppression", Proc. of the IEEE International Radar Conference, Jun. 1995, pp. 714-719.
Rincon, R.F., "Reconfigurable L-Band Radar", Proceedings of the 5th European Radar Conference, Oct. 2008, pp. 104-107.
Shelton, J.P. et al., "Multiple Beams from Linear Arrays", IRE Transactions on Antennas and Propagation; vol. 9; No. 2, Mar. 1961, pp. 154-161.
Sinnott, D.H. et al., "The Use of Overlapped Subarray Techniques in Simultaneous Receive Beam Linear Arrays", Electronics Research Laboratory, Defense Science and Technology Organisation Department of Defense, Adelaide, South Australia, Mar. 1984, pp. 21-37.
Volmer, C. et al., "An Eigen-Analysis of Compact Antenna Arrays and its Application to Port Decoupling", IEEE Transactions on Antennas and Propagation; vol. 56; No. 2, Feb. 2008, pp. 360-370.

* cited by examiner

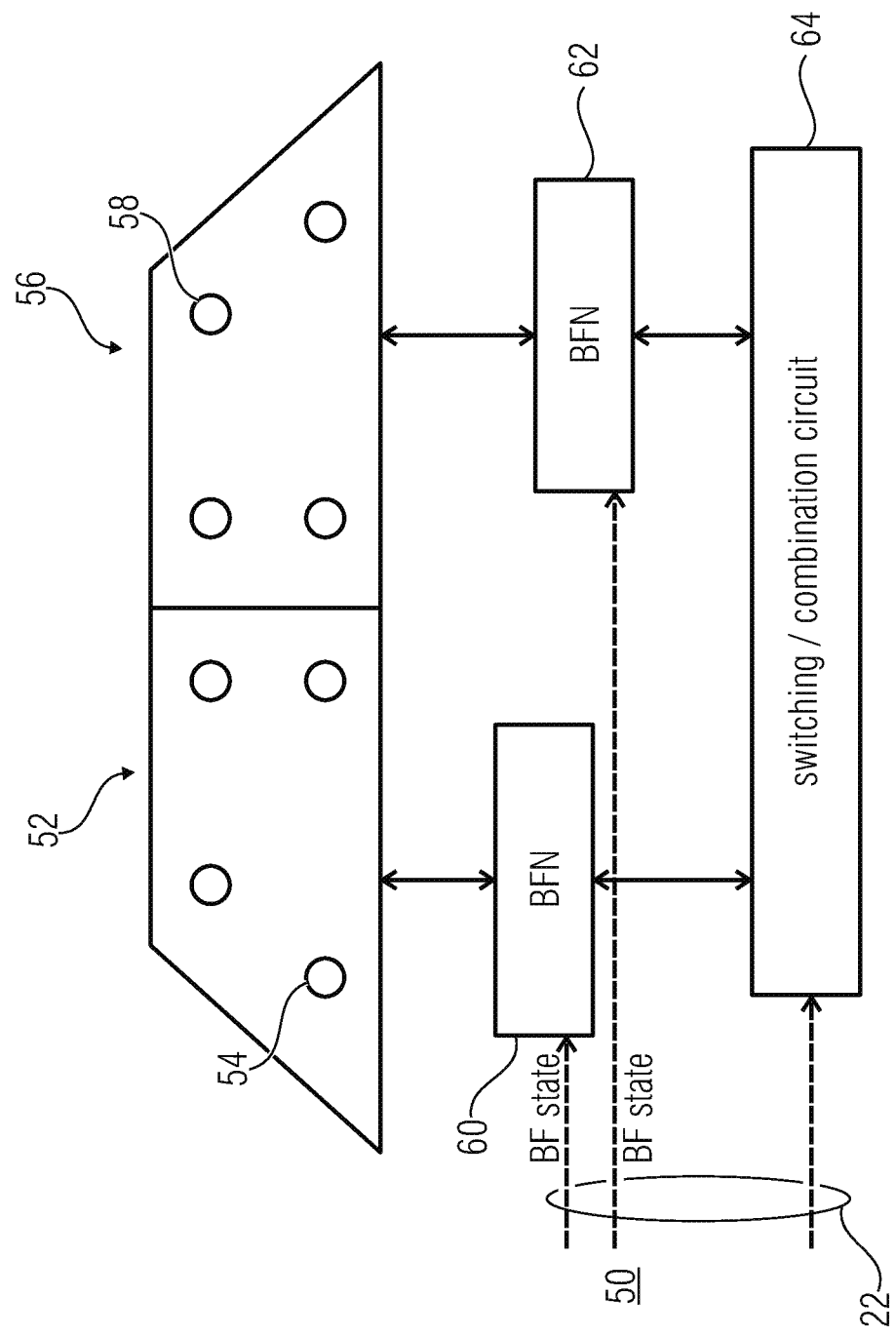

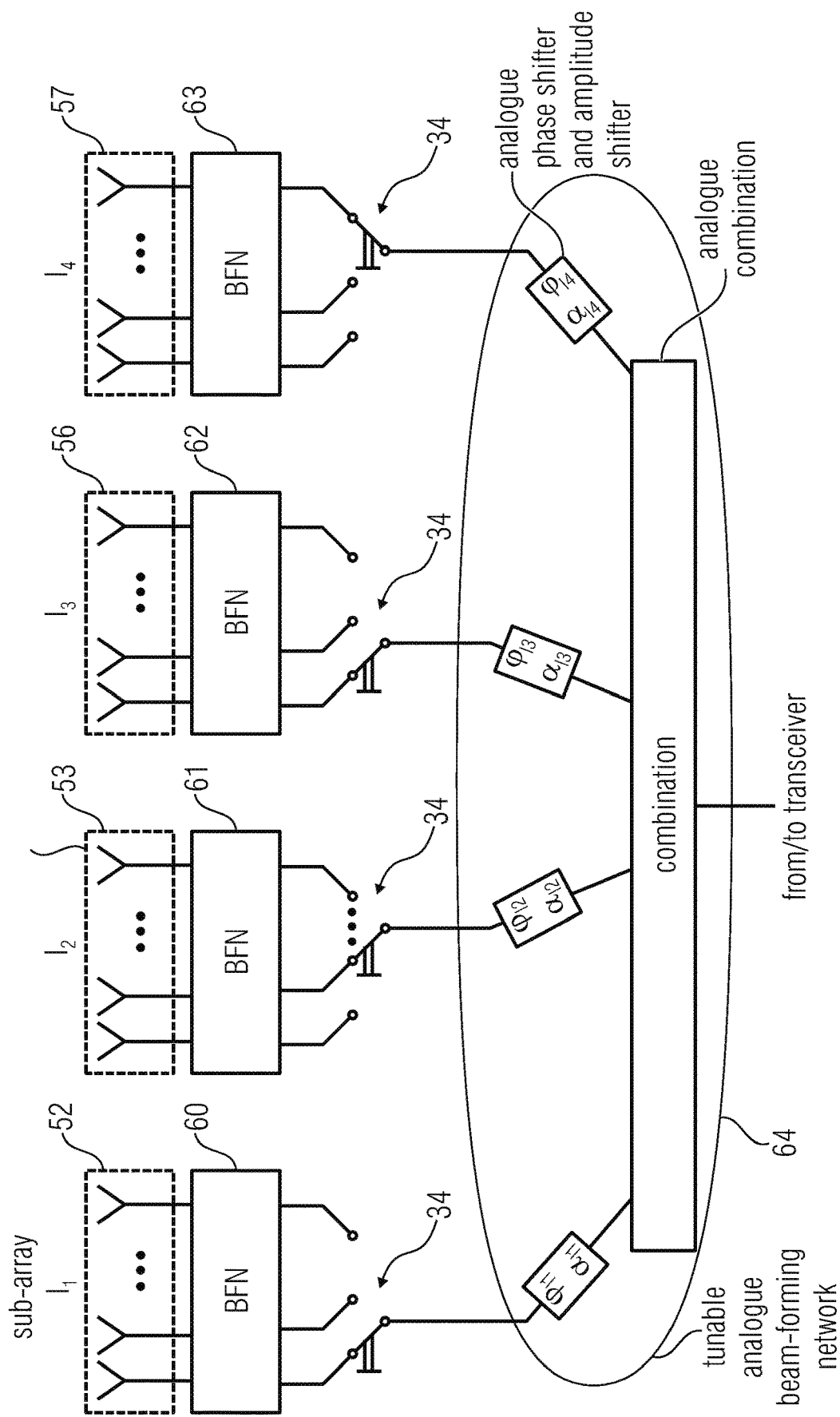

ANTENNA APPARATUS SUPPORTING ADJUSTABILITY OF AN ANTENNA BEAM DIRECTION

CROSS-REFERENCE TO RELATED APPLICATION

This application is a continuation of copending International Application No. PCT/EP2014/073158, filed Oct. 28, 2014, which is incorporated herein in its entirety by this reference thereto.

BACKGROUND OF THE INVENTION

The present application is concerned with an antenna apparatus supporting adjustability of an antenna beam direction.

In mobile scenarios, wireless communications systems take advantage of antennas that allow for an adaptive steering of the radiation characteristics. The antenna is able to vary its radiation characteristics according to the instantaneous situation. I.e., the main beam of radiation can be electronically aligned towards the remote station, independent of the relative orientation between both. This leads to a high signal quality and reliable transmission without any mechanical re-orientation of the antenna.

The beam forming in antenna array relies on the phase progression and amplitude distribution along the radiating aperture. The phase and amplitude applied to the antenna elements is generated by an excitation network, the so-called beam-forming network (BFN). It allows electronic variation of the phase and the amplitude of the signal to be transmitted or the signal received. Another way of generating the phase and amplitude distribution is to equip each antenna element with a dedicated signal branch, which covers the entire chain from the antenna to signal processing in baseband. For this case, the beam-forming is calculated in the digital domain. This approach provides the highest flexibility, indeed, as it offers the maximum degree of freedom. Yet, it is also the most expensive one, necessitating the largest number of hardware components as opposed to other approaches.

The intention of using a BFN is to reduce the number of parallel signal branches and, therefore, the effort of hardware. To this end, the BFN connects to the antenna array, combines the antenna signals in receive mode or distributes the transmit signal(s) amongst the antennas in transmit mode, and provides a reduced number of ports (e.g. reduction down to one port) to the following stages. Technically, there are two types of BFNs: BFNs providing a set of fixed radiation characteristics being switchable ("fixed BFN") and BFNs providing steerable radiation characteristics ("tunable BFN"). The former necessitates only a single switching signal that determines the radiation characteristic to be generated by selecting the proper signal path of the BFN. It is therefore easy to implement, yet display the lowest flexibility. A tunable BFN comprise steerable components such as phase shifters and amplitude shifters, which are controlled via a number of control signals. It is more flexible than the former, but necessitates more effort in design, is more prone to losses, and is more sensitive to temperature variation and environmental influences.

Fixed BFNs have been well known for several decades. A systematic approach to the design of a fixed BFN is the so-called Butler-Matrix (see J. P. Shelton et al., "Multiple Beams from Linear Arrays," IRE Transactions on Antennas and Propagation, vol. 9, no. 2, pp. 154-161, March 1961). A Butler matrix comprises a number of hybrid couplers and delay lines to generate a pre-defined set of output signals for antenna feeding. It can be considered the circuit implementation of the fast Fourier transform. The systematic design of a Butler matrix is limited to arrays with an inter-element spacing of half a wavelength. Even though other arrangements are possible, but this results in less performance and in a limited coverage. The achievable radiation characteristics are basically pre-defined and can hardly be adjusted to a given scenario. This holds also for the combination of two or more beams of a Butler matrix.

A further approach to the design of fixed BFN is based on the eigenmodes of antenna arrays (see C. Volmer et al., "An eigen-analysis of compact antenna arrays and its application to port decoupling," IEEE Transactions on Antennas and Propagation, vol. 56, no. 2, pp. 360-370, February 2008). As a Butler matrix, the so-called eigenmode BFN comprises hybrid couplers and delay lines and can be systematically designed. While this technique can be applied to an arbitrary array, it provides only the pre-defined eigenmode radiation characteristics of the array. An eigenmode BFN technically maintain all degrees of freedom of the array, but to achieve practical radiation patterns (e.g. for mobile satellite communications) much effort is necessitated for the proper combination of the eigenmode patterns.

Tunable BFNs are used in phase array antennas. Each antenna element is fed by a signal that is individually controlled in terms of phase and amplitude. The combination of the radiation characteristics stemming from the signals of all antennas leads to the desired radiation characteristic (see R. Baggen et al., "A Compact Phased Array for SatCom Applications," in Proc. of the 2013 IEEE International Symposium on Phased Array Systems & Technology, Waltham, Mass., USA, 15-18 Oct. 2013, pp. 232-239 and L. Krnan et al., "Reconfigurable Digitally Scanned Polarimetric L-Band Radar", in Proc. of the 2009 IEEE Radar Conference, Pasadena, Calif., 4-8 May 2009). Such implementations suffer from high power consumption and/or low system performance, leading to a large antenna aperture and, therefore, large dimensions. They, furthermore, are sensitive to temperature variations and environmental influences; hence, much effort for calibration has to be spent.

In radar applications, arrays are often divided into sub-arrays that are controlled in amplitude and phase for mitigation of interferers (see U. Nickel, "Subarray configuration for digital beamforming with low sidelobes and adaptive interference suppression," in Proc. of the IEEE International Radar Conference, 1995 and U. Nickel, "Array Processing for Radar: Achievements and Challenges," International Journal of Antennas and Propagation, July 2013). Such implementations, however, usually aim at radiation characteristics pointing towards boresight. Other implementations use sub-array configurations with each sub-array connecting to a dedicated signal branch (see R. F. Rincon, "Reconfigurable L-Band Radar," in Proc. of the 5th European Radar Conference, Amsterdam, The Netherlands, October 2008 and D. H. Sinnott et al., "THE USE OF OVERLAPPED SUBARRAY TECHNIQUES IN o SIMULTANEOUS RECEIVE BEAM LINEAR ARRAYS," March 1984). The signals of the sub-array elements are simply summed up, without the possibility to vary the amplitude and phase of individual sub-array elements.

SUMMARY

According to an embodiment, an antenna apparatus supporting adjustability of an antenna beam direction may have: an antenna array of antennas; a beamforming network having M antenna interfaces and being switchable between m fixedly preconfigured beamforming states so as to couple the M antenna interfaces at different mutual phase and/or amplitude variations, and a switching network switchable between N different connecting states, wherein the switching network is configured to, in each connecting state, connect the M antenna interfaces with a set of M antennas of the antenna array such that relative positions of the M antennas connected to the M antenna interfaces in the respective connecting state, differ among the N connection states.

According to another embodiment, an antenna apparatus supporting adjustability of an antenna beam direction may have: an antenna array of antennas having a first set of antennas and a second set of antennas; a first beam forming network connectable to the first set of antennas and being switchable between fixedly preconfigured beam forming states so as to couple the first set of antennas at different mutual phase and/or amplitude variations, a second beam forming network connectable to the second set of antennas and being switchable between fixedly preconfigured beam forming states so as to couple the second set of antennas at different mutual phase and/or amplitude variations, wherein the m fixedly preconfigured beam forming states of the first beam forming network result in a first set of different beam directions which is disjoint to a second set of different beam directions resulting from the fixedly preconfigured beam forming states of the second beam forming network.

According to another embodiment, a method supporting adjustability of an antenna beam direction using an antenna array of antennas, the method using a beamforming network having M antenna interfaces and being switchable between m fixedly preconfigured beamforming states so as to couple the M antenna interfaces at different mutual phase and/or amplitude variations, may have the step of: switching between N different connecting states, wherein, in each connecting state, the M antenna interfaces are connected with a set of M antennas of the antenna array such that relative positions of the M antennas connected to the M antenna interfaces in the respective connecting state, differ among the N connection states.

Still another embodiment may have a method supporting adjustability of an antenna beam direction using an antenna array of antennas, the method using an antenna array of antennas having a first set of M antennas and a second set of antennas, a first beam forming network connectable to the first set of antennas and being switchable between fixedly preconfigured beam forming states so as to couple the first set of antennas at different mutual phase and/or amplitude variations, a second beam forming network connectable to the second set of antennas and being switchable between fixedly preconfigured beam forming states so as to couple the second set of antennas at different mutual phase and/or amplitude variations, wherein the fixedly preconfigured beam forming states of the first beam forming network result in a first set of different beam directions which is disjoint to a second set of different beam directions resulting from the fixedly preconfigured beam forming states of the second beam forming network.

It is a basic finding of the present application that a support of an adjustability of an antenna beam direction may be rendered less expensive in terms of implementation, if a beam forming network switchable between fixedly preconfigured beam forming states is coupled to an antenna array via a switching network switchable between different connecting states according to which the antenna interfaces of the beam forming network are connected to the antennas so that relative positions of the antennas connected to the antenna interfaces differ among the connection states, or by providing more than one beam forming network, each switchable between fixedly preconfigured beam forming states, and coupled to a respective set of antennas of an antenna array, respectively, with the beam directions of provided be the beam forming networks being mutually disjoint. In either case, any implementation is alleviated by the fact that the beam forming network(s) may be of the fixed type, while the adjustability of the antenna beam direction is nevertheless, due to the advantageous combination of beam forming network and switching network or the combination of beam forming networks and their associated antenna sets, increased relative to the usage of a usual fixed or tunable beam forming network solution providing the same adjustment variability.

BRIEF DESCRIPTION OF THE DRAWINGS

Embodiments of the present application are described below with respect to the figures, among which:

FIG. 9a shows a block diagram of an antenna apparatus exploiting the combination of two beam forming networks with associated antenna sets in accordance with an embodiment;

FIG. 19c shows a block diagram of the antenna apparatus of FIG. 19a using a switching/combining circuit embodied as a BFN operating in the analogue domain;

DETAILED DESCRIPTION OF THE INVENTION

Figure 1:
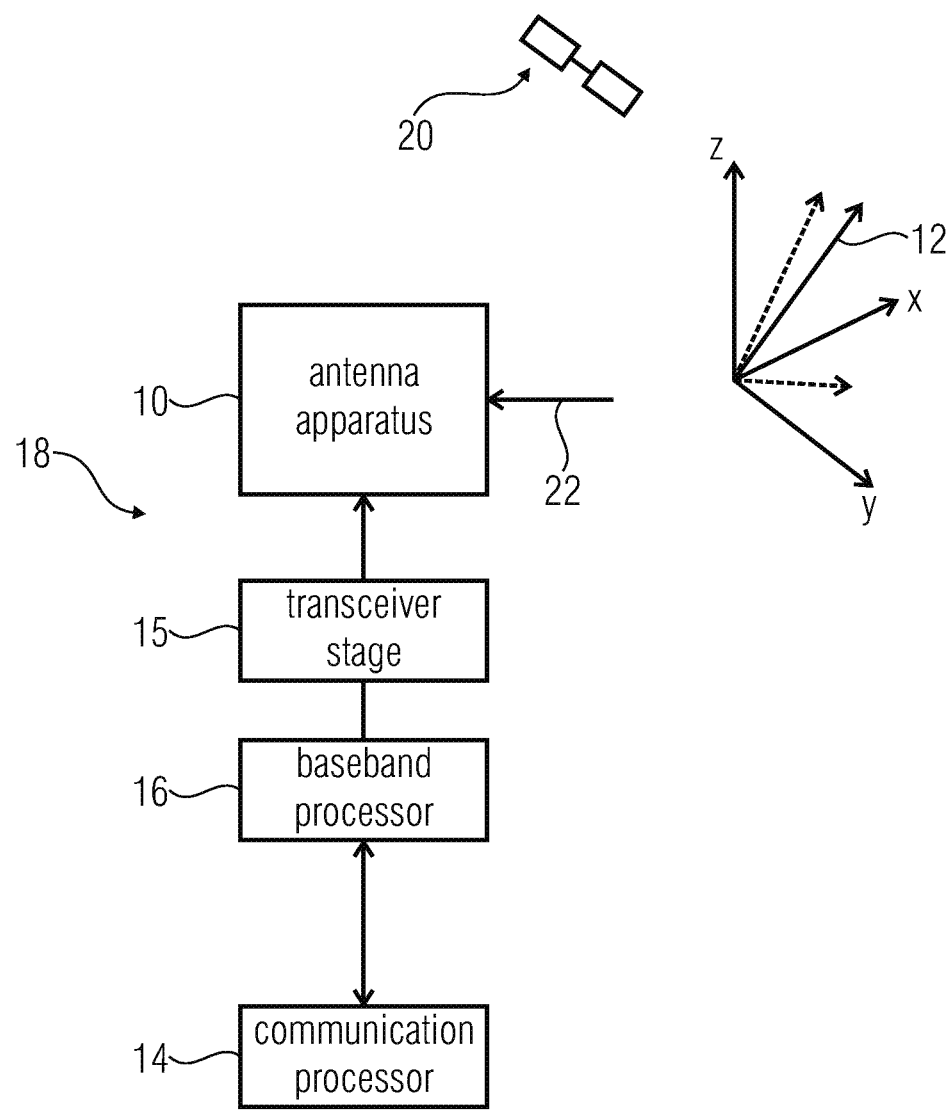
FIG. 1 shows a block diagram of a communication apparatus wherein an antenna apparatus according to the present application may be favorably used.

FIG. 1 shows an antenna apparatus 10 supporting an adjustability of an antenna beam direction 12, the antenna apparatus 10 being connected to a communication (or application) processor 14 via a concatenation of a transceiver stage 15 and a baseband processor 16. Together, antenna apparatus 10, transceiver 15, baseband processor 16 and communication processor 14 form a communication apparatus for communicating with a third party via a wireless channel which extends along direction 12. For example, the wireless channel extends between communication apparatus 18 and a satellite 20. The transceiver filters, amplifies, mixes-down from a transmission frequency into a baseband frequency or intermediate frequency, samples and digitizes a received signal which the antenna apparatus 10 receives via the wireless channel and forwards the received data stream to baseband processor 16, and forms, in turn, a transmission signal radiated by antenna apparatus 10 primarily into direction 12 from an inbound data stream received from communication processor 14 by digital/analog conversion, up-mixing, filtering and amplification. The baseband processor 15 may assume additional communication tasks in the digital domain such as certain protocol tasks, additional digital filtering, symbol modulation tasks, frequency division multiplexing tasks, Forward error correction/protection tasks or the like. The communication processor 14 itself may generate the data stream output to baseband processor 16 on the basis of a data stream received from an external processor and forward, in turn, a data stream generated from the data stream received from baseband processor 16 to the external processor. For example, communication processor 14 translates a digital, not yet demultiplexed data stream received from baseband processor 16 into an application specific data stream such as a coded audio/video data stream or the like and performs the opposite procedure in the transmission direction.

Owing to a movement of the antenna apparatus 10 and/or a movement of satellite 20, the relative position between antenna apparatus 10 and satellite 20 may change in time. That is, the direction at which antenna apparatus 10 "sees" satellite 20 may change in time so that the antenna beam direction 12 of antenna apparatus 10 may have to be adapted to the actual line-of-sight direction at which satellite 20 is positioned relative to antenna apparatus 10. To this end, antenna apparatus 10 comprises a control input via which antenna apparatus 10 allows for an adjustment of the antenna beam direction 12. For example, this control input 22 could be connected to communication processor 14, which in turn may use an iterative optimization procedure in order to continuously or intermittently achieve the adjustment. For example, such an iterative optimization procedure could aim at maximizing a received signal strength of the received signal output by antenna apparatus 10 by varying the antenna beam direction 12. The "antenna beam direction" of antenna apparatus 10 denotes, for example, the solid angle direction at which the radiation characteristic of antenna apparatus 10 has its maximum. An application scenery where the communication apparatus 18 of FIG. 1 may be used is, for example, the automotive area: the communication apparatus 18 may be arranged on a roof of a car which moves and, accordingly, necessitates an adjustment of the antenna beam direction 12 so as to head into a direction of one available satellite 20 in the upper hemisphere. However, this application scenario is merely for illustration purposes and the embodiments described hereinafter should not be restricted to that application scenery, neither with respect to the satellite communication nor to the automotive application. Moreover, although the communication of FIG. 1 via the wireless channel and antenna apparatus 10, respectively, involves both reception and transmission, antenna apparatus 10 may be used for reception only or for transmission only, alternatively. Moreover, although antenna apparatus 10 is illustrated in FIG. 1 as not including the transceiver processing tasks, antenna apparatus 10 could, in accordance with alternative embodiments, also include the transceiver tasks as it will sometimes be discussed further below.

Naturally, it would be favorable to be able to adjust the antenna beam direction as precisely as possible. As described in the introductory portion of the specification of the present application, however, allowing for freely tunable antenna beam direction via a tunable beam forming network in antenna apparatus 10 would necessitate a complex and expensive implementation. The usage of a fixed beam forming network allowing for a setting of the antenna beam direction 12 to any of K predefined beam directions may lower these efforts, but nevertheless such a fixed beam forming network would necessitate K×M phase/amplitude adapting paths with M denoting the number of antennas used by antenna apparatus 10 for the beam forming.

In order to decrease this overhead at the same adjustability or increase the adjustability refinement of the antenna beam direction at comparable implementation complexity, the embodiments described hereinafter provide an antenna apparatus of an improved concept.

Figure 2:
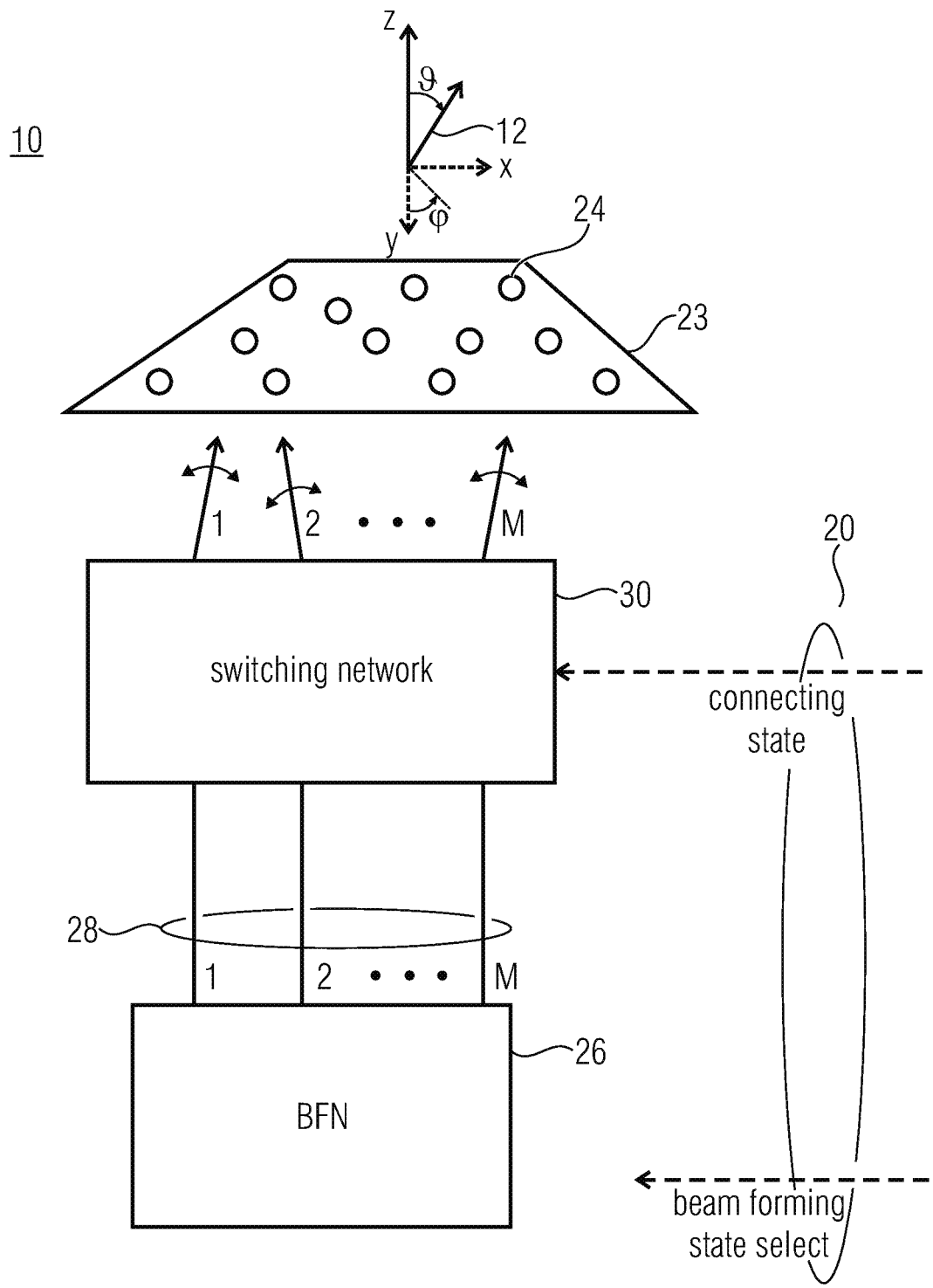
FIG. 2 shows a block diagram of an antenna apparatus according to an embodiment of the present application using a combination of a beam forming network and a switching network.

FIG. 2 shows an antenna apparatus 10 supporting adjustability of the antenna beam direction 12 which comprises an antenna array 23 of antennas 24, a beam forming network 26 comprising M antenna interfaces 28 and a switching network 30 connected between the beam forming network 26 on the one hand and the antenna array 23 on the other hand. As will outlined in more detail below, in order to obtain the same degree of adjustability, i.e. predefined beam directions, the apparatus 10 necessitates merely m×M phase/amplitude adapting paths with m being far smaller than K as will get clear as described herein after.

Figure 3:
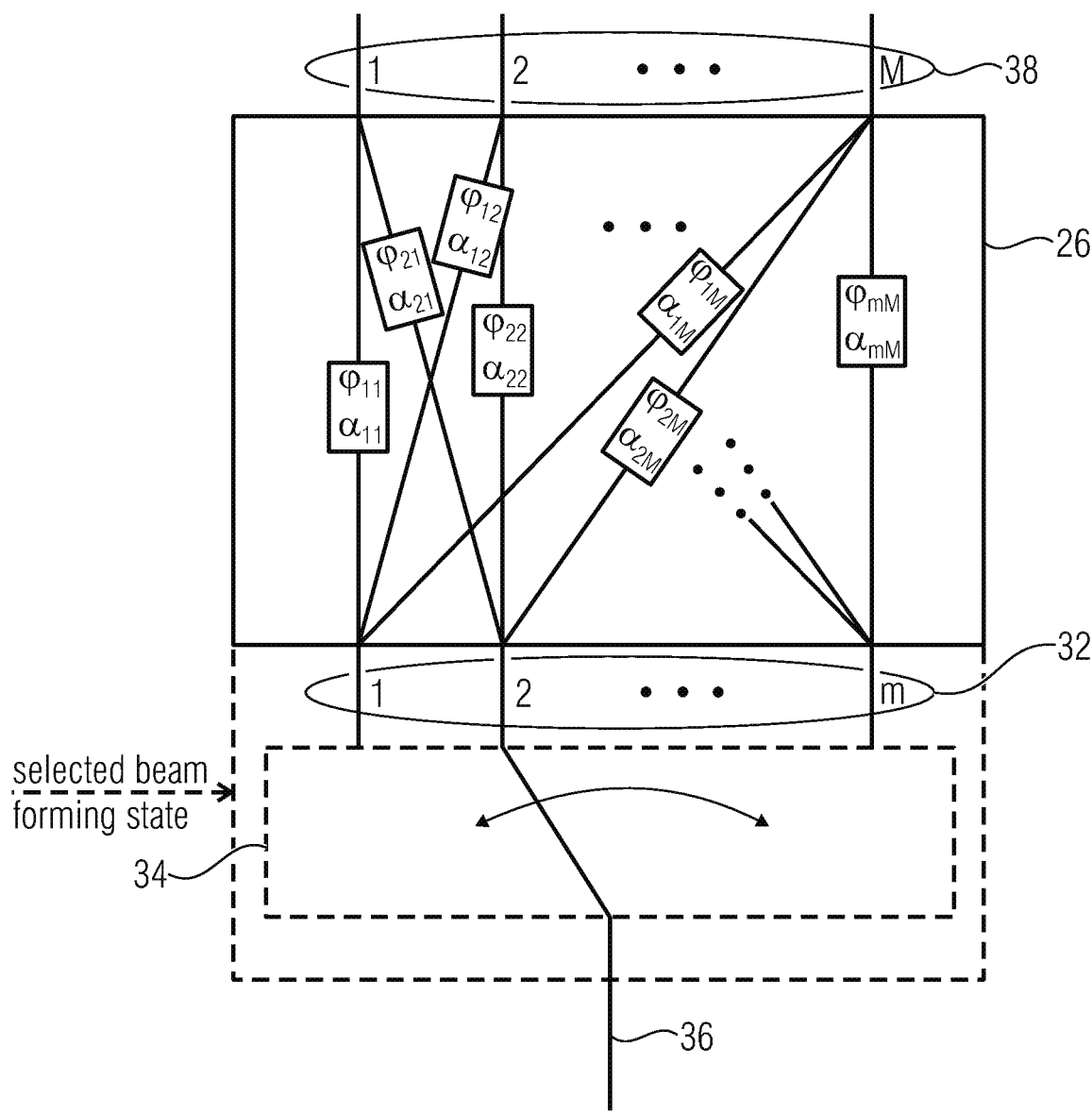
FIG. 3 shows a block diagram of the schematic nature of a beam forming network which may be used in FIG. 2.

The beam forming network is of the fixed type. That is, beam forming network 26 is switchable between m fixedly preconfigured beam forming states so as to couple the M antenna interfaces at different mutual phase and/or amplitude variations. See, for example, FIG. 3. FIG. 3 illustrates beam forming network 26 as comprising m signal interfaces 32 forming the antenna apparatus 10 interface for being connected to the transceiver stage 15, for example. Each of these signal interfaces corresponds to a respective one of the m fixedly preconfigured beam forming states and is, to this end, coupled to each of the M antenna interfaces 28. However, each signal interface 32 is connected to the M antenna interfaces at antenna interface individual phase delays and amplitude factors, which are specific for the respective fixedly preconfigured beam forming state. See, for example, the first signal interface at the left hand side of FIG. 3: same is connected to the first antenna input at phase delay $\varphi_{11}$ and amplitude factor $\alpha_{11}$, to the second antenna interface at phase delay $\varphi_{12}$, and amplitude factor $\alpha_{12}, \ldots$, and to the M-th antenna interface 28 at phase delay $\varphi_{1M}$ and amplitude factor $\alpha_{1M}$, and the second signal interface is connected to the first antenna interface at phase delay $\varphi_{21}$ and amplitude factor $\alpha_{21}$, the second antenna interface at phase delay $\varphi_{22}$, and amplitude factor $\alpha_{22}, \ldots$, and the M-th antenna interface at phase delay $T_{2M}$ and amplitude factor $\alpha_{2M}$ and so forth for the following signal interfaces. Each path connecting a certain signal interface 0<i<m and a certain antenna interface 0<j<M realizes the corresponding phase delay $\varphi_{i,j}$ and amplitude factor $\alpha_{i,j}$ via elements such as one or more of delay elements or phase shifters and amplitude shifters such as power couplers and attenuators, respectively. Altogether, there are m×M such paths.

The beam forming network 26 of FIG. 3 is thus switchable to any of the m fixedly preconfigured beam forming states by interfacing with the beam forming network 26 via any of the m signal interfaces 32 and changing the latter signal interface, respectively. FIG. 3 shows that, for example, the beam forming network may be interfaced to other elements such as the baseband processor or communication processor at its signal interface side via a switching circuit 34 configured to connect exactly one of the M signal interfaces of the beam forming network 26 with a common signal interface 36, which then in turn may be connected to a receiver and/or transmitter stage, such as the a receive branch and transmit branch of transceiver stage 15 of FIG. 1. That is, merely one of the signal interfaces and its corresponding preconfigured BFN state is active at each time instant.

The switching network 30 may merely consist of switching devices such as transistors or other high frequency switches and is switchable between N different connecting states. In other words, the switching network 30 assume exactly one of the N states at any time. In each connecting state, switching network 30 connects the M antenna interfaces 28 of beam forming network 26 with a set of M antennas of the antenna array such that relative positions of the M antennas 24 connected to the M antenna interfaces 28 in the respective connecting states, differ among the N connection states. In a manner outlined in more detail below, the provision of the N connecting states multiplicates the number of supported antenna beam direction of apparatus 10 from m as supported from the BFN 26 alone to m·N.

Figure 4A:
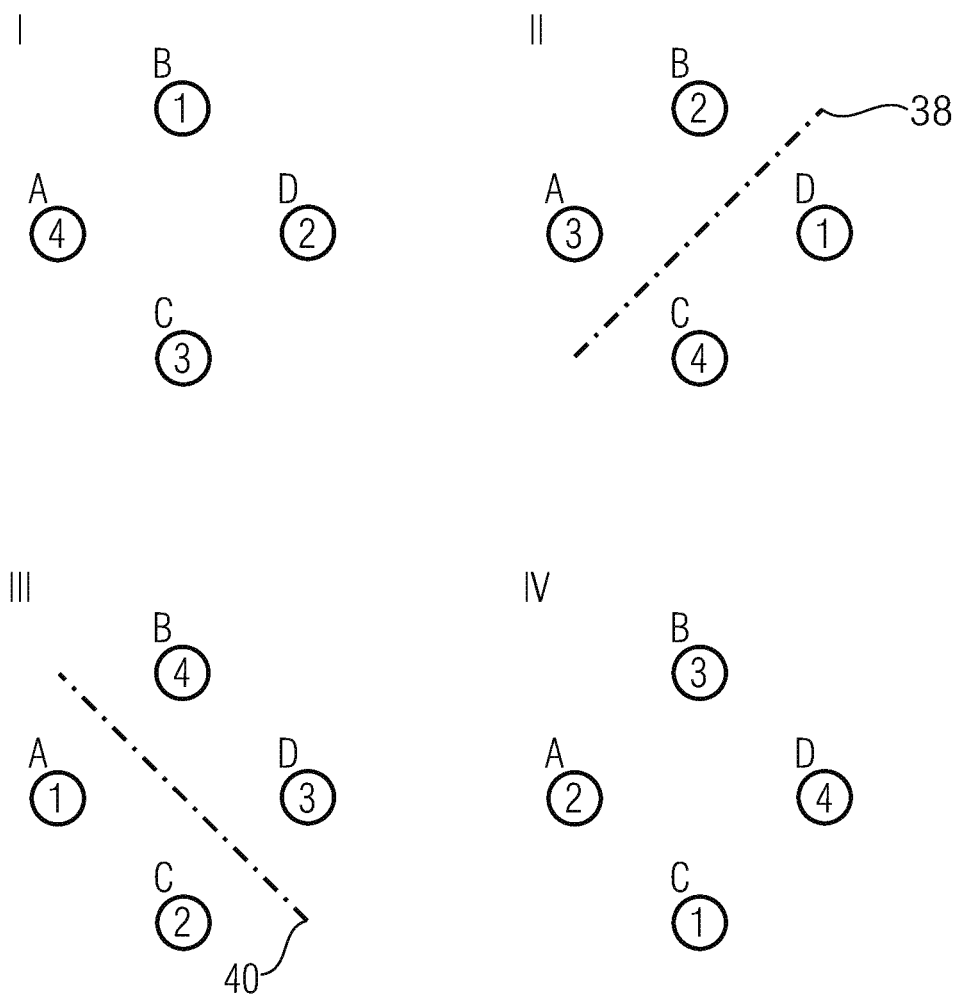
FIG. 4A shows the association between antennas A to D and antenna interfaces of beam forming network in accordance with four different connecting states of the switching network in accordance with an embodiment.

In order to explain this in more detail, reference is made to FIG. 4A. FIG. 4A illustrates an example for four different connecting states, i.e. N=4, indicated with Roman numbers I to IV. In the embodiment of FIG. 4A, the set of M antennas with which the M antenna interfaces of the beam forming network are connected by switching network 30, are the same among the connecting states. However, the association between the antennas and the M antenna interfaces is changed. The antennas are illustrated using capital letters A to D and the antenna interface connected to the respective antenna in the respective connecting state is indicated using an Arabic numbers 1 to 4 inscribed into a circle which shall illustrate the respective antennas A to D. As can be seen, in the first connecting state I, antenna interface 1 is connected to antenna B, antenna interface 2 with antenna D, antenna interface 3 with antenna C and antenna interface 4 with antenna A, wherein the antennas A to D are arranged clockwise at vertices of a square. In connecting state II, the association between antenna interfaces on the one hand and antennas on the other hand is reflected at a first reflection axis 38 of the square, and in the third connecting state III, the association is reflected at a perpendicular reflection axis 40 of the square. In the fourth connecting state IV, the association is, relative to connecting state I, reflected at both reflection axes 38 and 40.

Figure 4B:
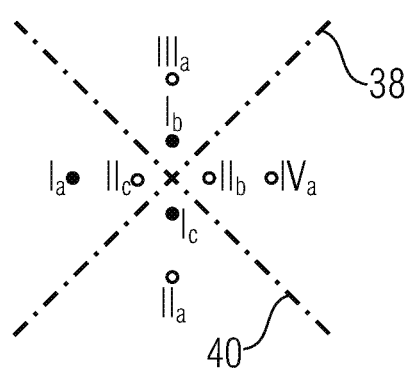
FIG. 4B shows an exemplary distribution of resulting beam directions achievable by the various combinations of connecting state and beam forming state achievable by FIG. 4A by illustrating the beam directions' heads when commonly originating at the antenna positions mid and having uniform length, seen in a plan view.

With the example of FIG. 4A, the switching network 30 has the following effect. As outlined above, the beam forming network 26 already allows for m fixedly preconfigured beam forming states. Each of these fixedly preconfigured beam forming states is associated with one beam direction. FIG. 4B illustrates, for example, that m=3. FIG. 4B shall illustrate the position of the head of the respective beam direction onto the plane of antennas A to D when originating at the center of the square at the vertices of which the antennas are positioned. The m=3 beam directions obtainable at connecting state I are illustratively as $I_a$, $I_b$ and $I_c$. Obviously, in connecting state II, the mutual phase and/or amplitude variations at which the antennas are coupled to each other, leads to a congruent set of beam directions, but reflected at axis 38. Accordingly, FIG. 4B denotes the resulting m=3 beam directions as connecting state II with $II_a$ to $II_c$. For illustration purposes, FIG. 4B merely illustrates one of the resulting beam directions for connecting states III and IV, representatively, in order to ease the legibility of FIG. 4B.

FIGS. 4A and 4B, thus, illustrate that the switching network 30 is able to multiplicate the beam directions achievable by beam forming network 26: at each connecting state, beam forming network 26 allows for m different beam directions, each associated with one of the m fixedly preconfigured beam forming states. For each of the connecting states, these m beam directions change so that altogether for N, i.e. the number of connecting states, times m, i.e. the number of fixedly beam forming states, different beam directions result provided that the m different beam directions are asymmetrically distributed with respect to reflection axes 38 and 40.

Thus, antenna apparatus 10 of FIG. 2, is controllable with respect to the N connecting state of switching circuit 30, and the m beam forming states of BFN 26, altogether resulting in m·N states to which apparatus 10 is controllable via control signal 22.

Figure 5:
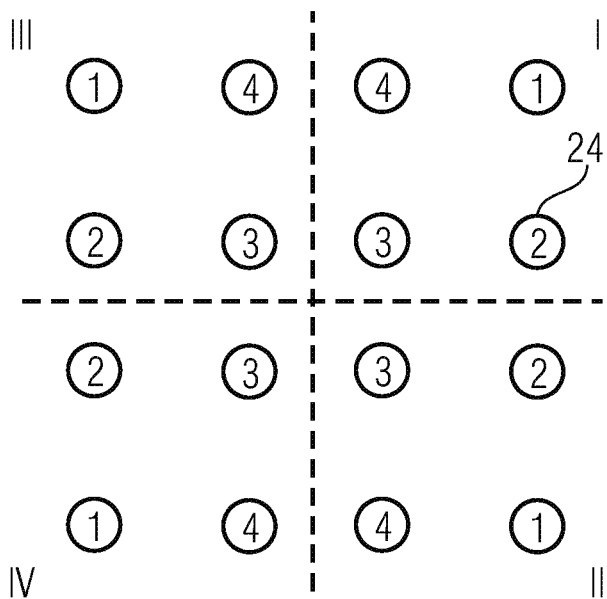
FIG. 5 shows a plan view onto an exemplary antenna array and showing an example of connecting states according to which disjoint subsets of the antennas are connected to the beam forming networks antenna interfaces.

However, the way the switching network 30 achieves the just outlined "multiplication" may be varied. FIG. 5, for example, illustrates that mutually disjoint subsets of M antennas may be connected to the M antenna interfaces in each connecting state, respectively. The numbers M=4 and m=3 and N=4 has been chosen in FIGS. 4A to 5 merely for illustration purposes, and it is noted that M may assume any value greater than 1, m may likewise assume any value greater than 1 and the same applies to N. For ease of understanding, representative values for m, N and M are further used hereinafter, but the respective embodiments shall not be restricted to these values, but also encompass alternatives of other values for m, N and M.

FIG. 5 illustrates that mutually disjoint sets of antennas are connected with the M antenna interfaces at each connecting state. At each connecting state, however, the M antennas are positioned at lattice sites of mutually congruent lattices all lying in a common plane. The fact that the relative positions of the M antennas connected to the M antenna interfaces differ among the N connection states in a non-pure-translatory manner results in the embodiment of FIG. 5 from the different association between correspondingly located antennas 24 on the one hand and the M antenna interfaces on the other hand. Correspondingly located antennas are antennas which are, by translating positions of antennas connected in one connecting state to positions of antennas connected in another connecting state, co-located. Insofar, the embodiment of FIG. 5 corresponds to the embodiment of FIG. 4A with merely using translatory displaced set of antennas in each of the connecting states.

In particular, in the embodiment of FIG. 5 the antennas 24 of the antenna array 23 are arranged in p·a columns and q·b rows and are partitioned into N=p·q sub-arrays of M=a·b antennas each. In an alternative embodiment to FIG. 5, the sub-arrays may be interleaved rather than positioned one next to the other with, for example, the antennas of one sub-array having p times the antenna column pitch and q times antenna row pitch of array 23.

Figure 6:
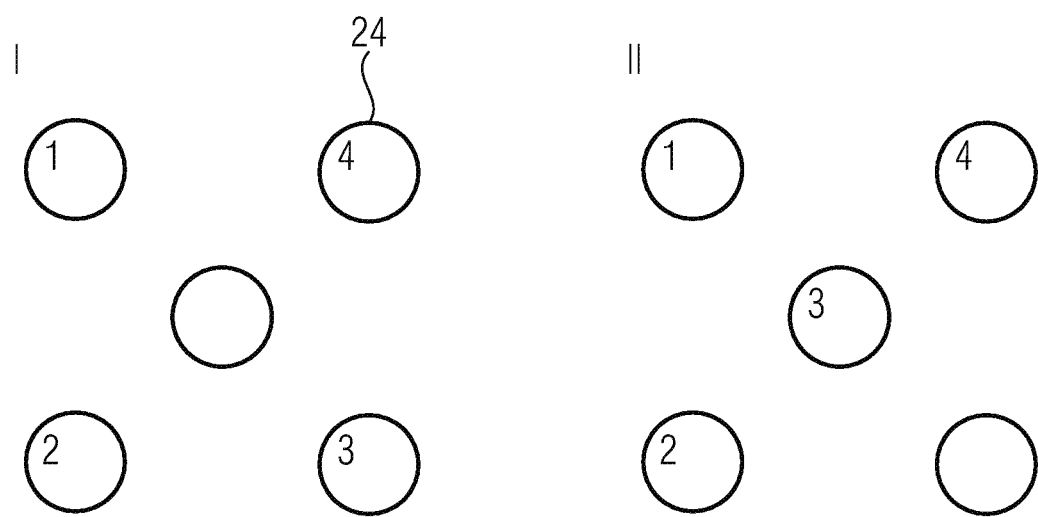
FIG. 6 shows a schematic diagram illustrating another possibility of implementing a connection/association between antennas and antenna interfaces in different connecting states I and II in accordance with an embodiment.

For the sake of completeness, FIG. 6 illustrates that the positions of the antennas connected to the M antenna interfaces does not need to be positioned at vertices of a polygon mutually congruent among the connecting states. FIG. 6 illustrates the top view onto five antennas 24, wherein FIG. 6 illustrates exemplarily two connecting states I and II. The M=4 antenna interfaces and their connection to the antennas 24 is illustrated again using Arabic numbers 1 to 4. As can be seen: the antennas 24 connected to the M antenna interfaces are arranged at positions which are not transformable to each other, or transferrable to each other, via one or a combination of rigid motions, namely translation, rotation and reflection. That is, the positions of the antennas connected with the M antenna interfaces at connecting state I compared with the positions of the antennas connected with the M antenna interfaces at connecting state II do not form mutually congruent polygons. Here, the beam forming network 26 may be optimized to have m beam directions in the antenna position constellation of connecting state I, but also pronounced beam directions at antenna position constellation in connecting state II, and beyond that these beam directions change, i.e. form mutually distinct sets, so that 2×m beam directions result.

It is noted that in the embodiments shown so far, the advantageous configuration has been shown where all the antennas 24 of the antenna array 23 are positioned in one plane. This configuration alleviates the fabrication and design process and is also advantageous in respect to satellite communication applications as outlined above. However, theoretically the antennas 24 could also be arranged at a curved surface so that changing the set of antennas connected to the antenna interfaces in the connecting states could, for example, change the m beam directions from one connecting state to the other by another tilt of the curved surface at the side of the respective connected antennas. However, as just outlined, positioning the antennas in one plane may be beneficial for other reasons.

Figure 7:
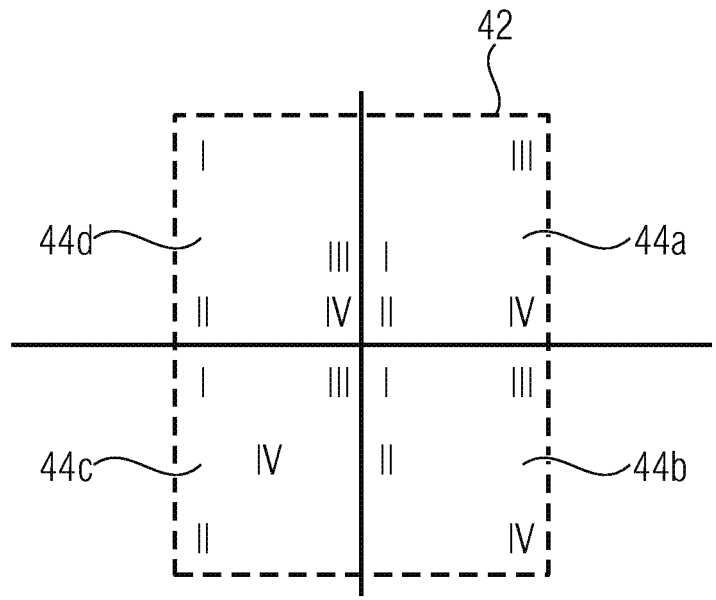
FIG. 7 shows a schematic diagram illustrating the interleaved distribution of beam directions of the different connecting states in the spanned solid angle region in accordance with an embodiment.

FIG. 7 illustrates that the sets of m different beam directions of the N connecting states may be interleaved so that a solid state angle region spanned by the sets of m different beam directions of the N connecting states, i.e. of all possible beam directions, may be partitioned into N (simply-connected) sections so that in each section there is exactly one beam direction of each of the sets of m beam directions of the M connecting states. FIG. 7, for example, shows a plan view onto a projection of the beam directions available at the various connecting states by indicating the position of each beam direction's head by a Romanic number indicating the connecting state at which the respective beam direction is rendered available as one of the various fixedly preconfigured beam forming states. Here, the solid state angle region 42 spanned by all different m×N beam directions is indicated at 42, and as can be seen, this solid state angle region 42 may be partitioned into four sections, namely quarters, so that in each quarter one beam direction of each connecting state resides, with these sections denoted 44a to 44d.

On the one hand, this distribution of the supported beam directions over the overall solid state angle region 42 enables to achieve an improved coverage of the solid state angle region 42 and on the other hand, this distribution alleviates further improving the adjustability of the antenna beam direction of the antenna apparatus by "interpolating" between two beams by using two concatenations of switching network and beam forming network in parallel, as will be outlined in more detail below. In particular, by distributing the beam directions in the manner shown in FIG. 7, it is possible that to, in any location of the solid state angle region 42, interpolate between two beam directions of two different connecting states so as to adjust the resulting antenna apparatus' antenna beam direction to an intermediate state therebetween.

Figure 8:
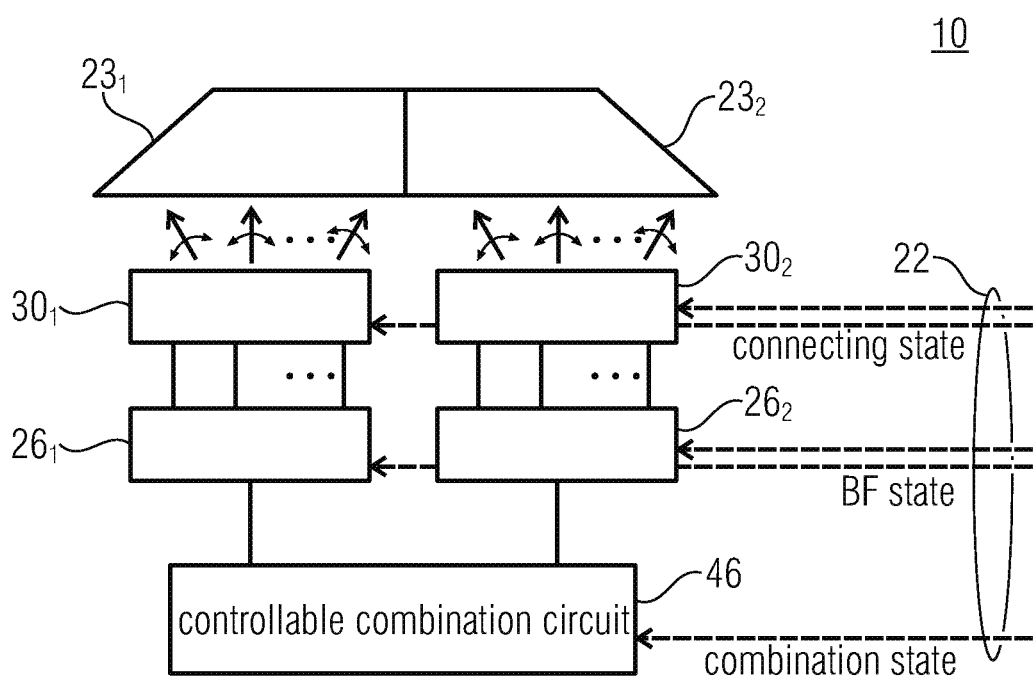
FIG. 8 shows a block diagram of an antenna apparatus in accordance with a further embodiment of the present application using two concatenations of antenna array, switching circuit and beam forming network in parallel.

In order to illustrate this, see FIG. 8. FIG. 8 shows an antenna apparatus 10 comprising two times the concatenation of antenna array, switching network and beam forming network, these elements being indicated in FIG. 8, thus using the same reference signs but having an index of 1 and 2, respectively, added. As described above, each concatenation of antenna array, switching network and beam forming network may controlled with respect to both connecting state and fixedly preconfigured beam forming state. That is, each concatenation is switchable between m×N states independently from each other. As far as the beam directions related to these m×N states are concerned, same coincide when comparing both concatenations of antenna array, switching network and beam forming network so that, prima facie, no benefit would be achievable. However, the apparatus 10 of FIG. 8 additionally comprises a controllable combination circuit configured to couple, in a controllable manner, a signal interface of beam forming network $26_1$ and a signal interface of beam forming network $26_2$ so that the antenna apparatus' 10 antenna beam direction results from a combination of beams of antenna arrays $23_1$ and $23_2$, respectively. For example, in order to achieve a certain intermediate direction between two beam directions shown in FIG. 7, the two concatenations $23_1$ to $26_1$ and $23_2$ to $26_2$, respectively, are set to the two nearest beam directions, for example, by setting them to the corresponding pair of connecting state and fixedly preconfigured beam forming state, respectively, with the controllable combination circuit 46 suitable "panning" between the two beam directions by appropriately connecting the two signal interfaces of beam forming networks $26_1$ and $26_2$ with a common signal interface, i.e. at a respective distribution of amplification factors with or without respective phase delays. The controllable combination circuit 46 may be completely operate in the analog domain. That is, the common signal interface depicted as leading downwards in FIG. 8, may be connected, for example, to a receiver and/or transmitter stage, such as the a receive branch and transmit branch of transceiver stage 15 of FIG. 1.

Alternatively, the controllable combination circuit 46 may operate in the digital domain. That is, both between controllable combination circuit 46 and BFN $26_1$ and between controllable combination circuit 46 and BFN $26_2$ a respective receiver and/or transmitter stage, such as the a receive branch and transmit branch of transceiver stage 15 of FIG. 1, may be positioned, so that the controllable combination circuit 46 digitally interfaces with the BFNs and digitally combines the signals to/from the BFNs at the wanted phase and/or amplitude difference. Reference is also made with respect to FIG. 19d in this regard.

Thus, antenna apparatus 10 of FIG. 8, is controllable with respect to the m beam forming states of BFN $26_1$, m beam forming states of BFN $26_2$, and L control states of controllable combination circuit 46, altogether resulting in approx. m·m·L states to which apparatus 10 of FIG. 8 is controllable via control signal 22. The L control states of controllable combination circuit may include/discriminate between two or more of merely using BFN $26_1$, i.e. connecting the BFN $26_1$'s signal interface with a signal interface of controllable combination circuit 46 and leaving the BFN $26_2$'s signal interface unconnected, merely using BFN $26_2$, i.e. connecting the BFN $26_2$'s signal interface with the signal interface of controllable combination circuit 46 and leaving the BFN $26_1$'s signal interface unconnected, and one or more states where the BFN $26_1$'s and BFN $26_2$'s signal interfaces are connected to the signal interface of controllable combination circuit 46 at a settable phase difference $\Delta\varphi$ and/or amplitude ratio between the paths between the BFN $26_1$'s signal interface and the signal interface of controllable combination circuit 46 and the BFN $26_2$'s signal interface and the signal interface of controllable combination circuit 46, respectively.

FIG. 9a shows another embodiment for an antenna apparatus supporting an adjustability of antenna beam. The antenna apparatus of FIG. 9a is indicated with reference sign 50. The antenna apparatus 50 comprises a first set 52 of M antennas 54 and a second set 56 of M antennas 58. A first beam forming network 60 is connectable to the first antenna set 52, while a second beam forming network 62 is connectable to the second antenna set 56. The beam forming network 60 and 62 are switchable between m fixedly preconfigured beam forming states, respectively. At each of these beam forming states, the antennas 54 of antenna set 52 are coupled at different mutual phase and/or amplitude variations at the m fixedly preconfigured beam forming states, and the same applies to the antennas 58 of antenna set 56. The m fixedly preconfigured beam forming states of the first beam forming network 60 result in a first set of m different beam directions which are disjoint to the m different beam directions resulting from the m fixedly preconfigured beam forming states of the second beam forming network 62. FIG. 9a shows that a switching/combination circuit 64 may switch between and/or combine the signal interfaces of the beam forming networks 60 and 62. A combination may result in a panning/interpolation between two beam directions similar to the embodiment of FIG. 8, and a switching would correspond to using either one of beam forming network 60 or beam forming network 62. In other words, while the switching of the antenna apparatus 10 of FIG. 2, for example, took place by appropriately setting the connecting state and the fixedly preconfigured beam forming state respectively, the setting is performed in the antenna apparatus of FIG. 9a by appropriately selecting the beam forming network to be used, i.e. 60 or 62, and then setting the fixedly preconfigured beam forming state of the selected beam forming network. The switching/combination circuit 64 of FIG. 9a is insofar optional. The selection among the beam forming networks 60 and 62 could be performed by another entity.

If the switching/combination circuit 64 is present, antenna apparatus 10 of FIG. 9a is controllable with respect to the m beam forming states of BFN 60, m beam forming states of BFN 62, and L control states of switching/combination circuit 64, altogether resulting in approximately m·m·L states to which apparatus 10 of FIG. 9a is controllable via control signal 22. The L control states of controllable switching/combination circuit 64 may include/discriminate between two or more of merely using BFN 60, i.e. connecting the BFN 60's signal interface with a signal interface of switching/combination circuit 64 and leaving the BFN 62's signal interface unconnected, merely using BFN 62, i.e. connecting the BFN 62's signal interface with the signal interface of switching/combination circuit 64 and leaving the BFN 60's signal interface unconnected, and one or more states where the BFN 60's and BFN 62's signal interfaces are connected to the signal interface of switching/combination circuit 64 at a settable phase difference Δφ and/or amplitude ratio between the paths between the BFN 60's signal interface and the signal interface of switching/combination circuit 64 and the BFN 62's signal interface and the signal interface of switching/combination circuit 64, respectively.

Figure 9B:
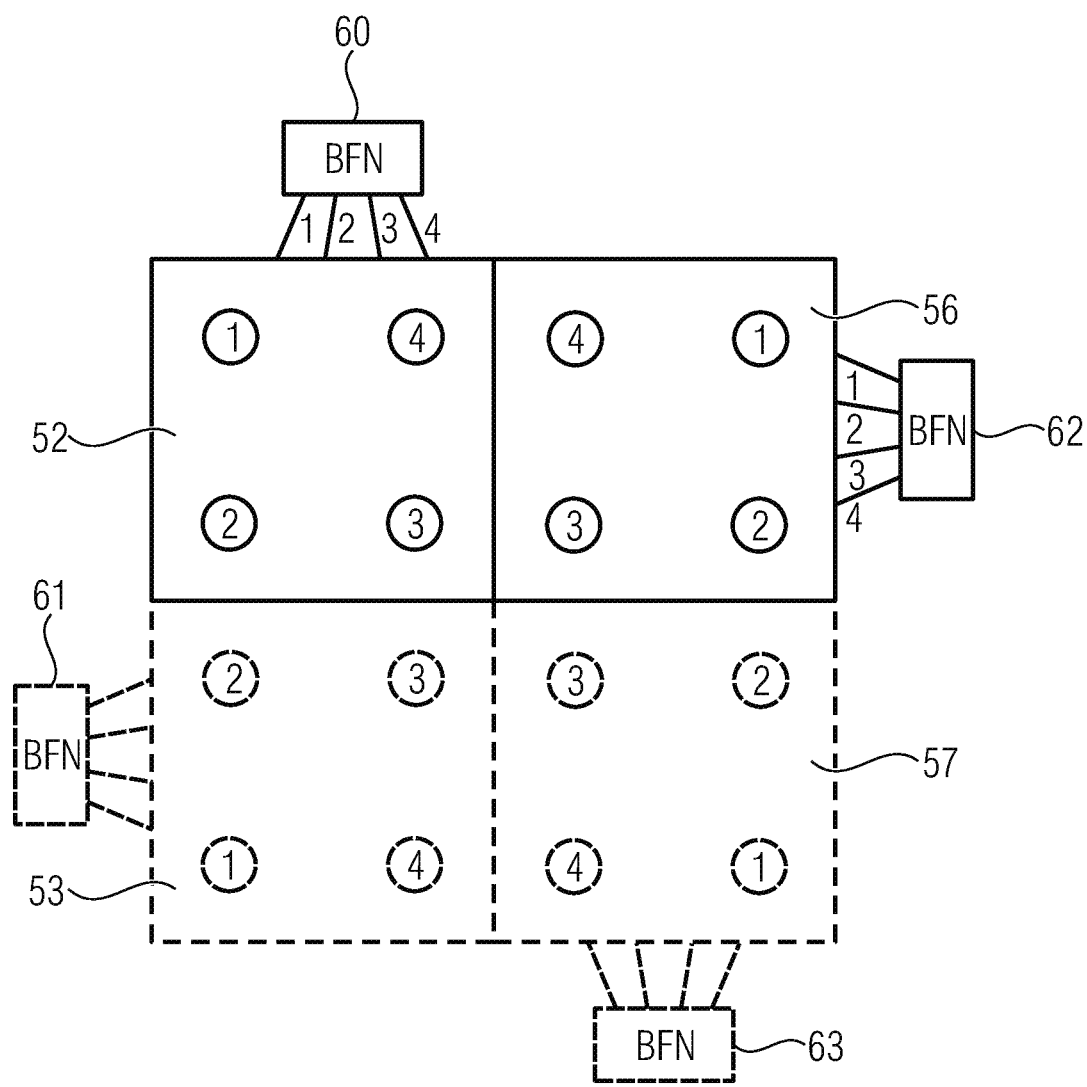
FIG. 9b shows a block diagram of an antenna apparatus exploiting the combination of two or more beam forming networks with associated antenna sets in accordance with an embodiment using an antenna array sub-divided and connected to the BFNs according to FIG. 5.

With respect to FIG. 3, it is noted that different from the above description, the switching circuit 34 could be interpreted as being part of the beam forming network itself. As far as the embodiment of FIG. 9a is concerned, the rules for arranging the antennas 54 and 58, respectively, when using identical beam forming networks 60 and 62, correspond to those described above with respect to FIGS. 5 to 7. That is, the relative positions of the antennas connected to the beam forming networks 60 and 62, respectively, is different as far as the antennas 54 on the one hand and 58 on the other hand are concerned, and this difference may be achieved by differently distributing the antennas, i.e. in such a manner that the positions at which antennas 54 are positioned are not transformable/transferrable onto the positions of antennas 58 by a translation, or at least if such transferal/transformation is feasible, the association/connection between the antennas 54 on the one hand and the m antenna interfaces of beam forming network 60 differs from the association between the corresponding antennas 58 on the one hand and the m antenna interfaces of beam forming network 62 on the other hand, wherein "corresponding" denotes the pairs of antennas 54 and 58, respectively, transformed onto each other by way of translation. This is illustrated in FIG. 9b. Here, BFNs 60 and 62 may be equally designed. FIG. 9b also illustrates the possibility that more than two BFN may optionally be connected in parallel as will later be described with respect to FIGS. 19a to 19e, too. FIG. 9b illustrates two additional ones 61 and 63, respectively, connected to antenna arrays 53 and 57, respectively. The antenna sets 52 to 57 from an array such as that depicted in FIG. 5, for example.

Figure 9C:
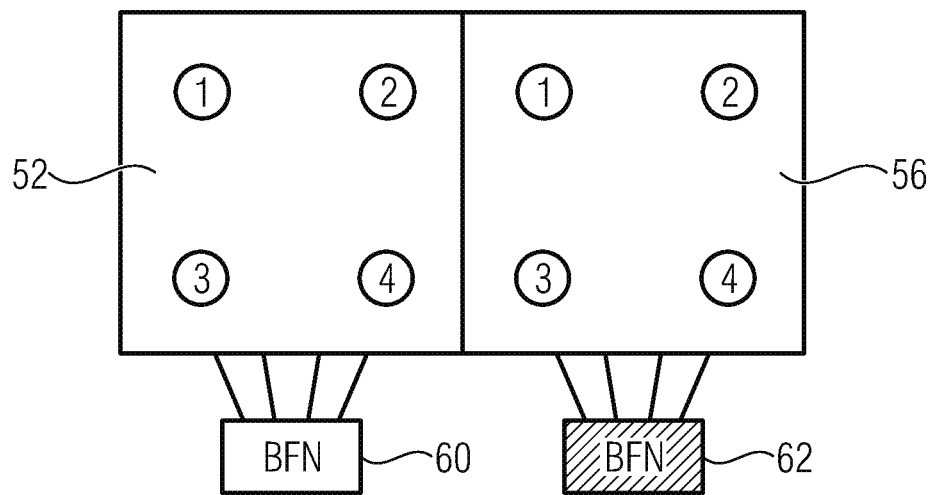
FIG. 9c shows a block diagram of an antenna apparatus exploiting the combination of beam forming networks with associated antenna sets in accordance with an embodiment using BFNs with paths of different phase/amplitude differences so as to achieve disjoint sets of beam directions, respectively.

Another way of achieving a multiplication of the supported antenna beam directions of apparatus 50 of FIG. 9a would, however, be to design the beam forming networks 60 and 62 differently. This possibility is depicted in FIG. 9c which illustrates a different design of BFNs 60 and 62 by use of hatching and non-hatching, respectively. Naturally, a combination of these measures may be used as well.

In case of FIG. 9c, BFNs 60 and 62 differ in terms of the aforementioned phase delays $\varphi_{i,j}$ and amplitude factors for example. Further, even the number of antenna interfaces and beam forming states may differ, i.e. BFN 60 may be switchable between $m_1$ states with the number of antennas of array 52 being $M_1$ while BFN 62 is switchable between $m_2$ states with the number of antennas of array 56 being $M_2$, and the set of beam directions $\{r_{11} \ldots r_{1m1}\}$ resulting from the beam formation of BFN 60 at antenna array 52 being disjoint to the set of beam directions $\{r_{21} \ldots r_{2m2}\}$ resulting from the beam formation of BFN 62 at antenna array 56.

Compared thereto, in case of FIG. 9b, $m_1=m_2=m$, $M_1=M_2=M$, the M antennas of array 52 and 56 are positioned at mutual congruent positions and phase delays $\varphi_{i,j}$ and amplitude factors $\alpha_{i,j}$ are equal among BFNs 60 and 62 for all 0<i<m and 0<j<M with the disjoint nature of the sets of beam directions resulting from the different association between antennas and antenna interfaces as described above. Explicitly stated, the beam forming networks 60 and 62 may, for instance, be identical or symmetric to each other. The antennas 54 may be positioned within one common plane along with antennas 58. Antennas 54 may be distributed relative to each other in a manner so that, by translation, their positions are transferrable onto the positions of antennas 58. However, the relative positions of antennas 54 as connected to the M antenna interfaces of beam forming network 60 may differ from the relative positions of antennas 58 connected to the corresponding M antenna interfaces of beam forming network 62, namely by changing the association between the M antenna interfaces and corresponding antenna positions between beam forming network 60 on the one hand and beam forming network 62 on the other hand, as outlined above with respect to FIG. 5 or FIGS. 4A and 4B.

Figure 9D:
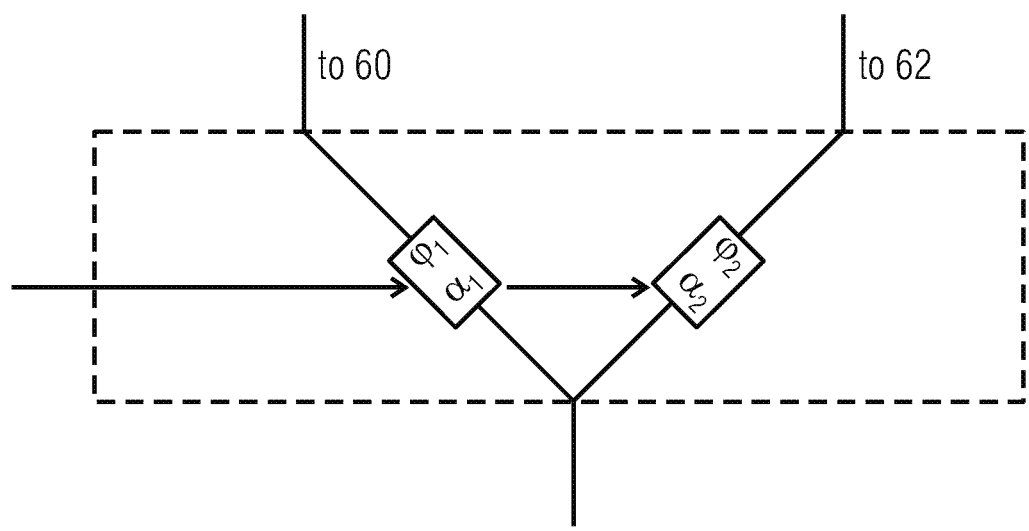
FIG. 9d shows a block diagram of a switching/combination circuit according to an embodiment.

As illustrated in FIG. 9d, the switching/combination circuit 64 may be configured to connect the signal interface of BFN 60 and BFN 62 to a common signal interface of switching/combination circuit 64 and may be controllable with respect to, for example, a phase difference $\Delta\varphi = |\varphi_2 - \varphi_1|$ between a phase delay $\varphi_1$ at which the BFN 60's signal interface and the signal interface of switching/combination circuit 64 are coupled and a phase delay $\varphi_2$ at which the BFN 62's signal interface and the signal interface of switching/combination circuit 64 are coupled, and with respect to an amplitude ratio $\Delta\alpha = \alpha_2/\alpha_1$ between an amplitude factor $\alpha_1$ at which the BFN 60's signal interface and the signal interface of switching/combination circuit 64 are coupled and an amplitude factor $\alpha_2$ at which the BFN 62's signal interface and the signal interface of switching/combination circuit 64 are coupled. The switching/combination circuit 64 may comprise respective delays, attenuators and the like.

Figure 9E:
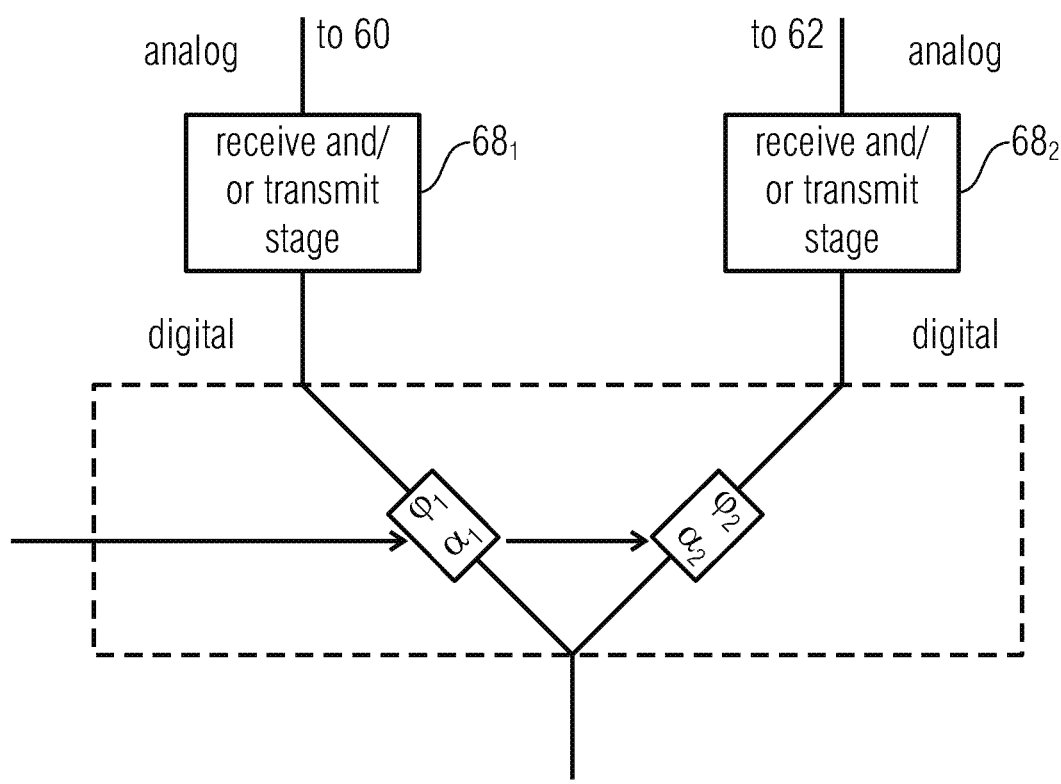
FIG. 9e shows a block diagram of a switching/combination circuit according to an embodiment where the switching/combination circuit operates in the digital domain.

The above statement with respect to controllable combination circuit 46 of FIG. 8 is also true with respect to switching/combination circuit 64: The latter may be completely operate in the analog domain with the common signal interface depicted as leading downwards in FIG. 9a-e, being connected, for example, to a receiver and/or transmitter stage, such as the a receive branch and transmit branch of transceiver stage 15 of FIG. 1. Alternatively, as illustrated in FIG. 9e, the controllable combination circuit 46 may operate in the digital domain. That is, both between circuit 64 and BFN 60 and between circuit 64 and BFN 62 respective receiver and/or transmitter stage $68_1$ and $68_2$, respectively, such as the a receive branch and transmit branch of transceiver stage 15 of FIG. 1, may be positioned, so that the controllable combination circuit 46 digitally interfaces via the stages $68_{1,2}$ with the BFNs 60 and 62 and digitally combines the signals to/from the BFNs at the wanted phase and/or amplitude difference. Reference is also made with respect to FIG. 19d in this regard.

Figure 19A:
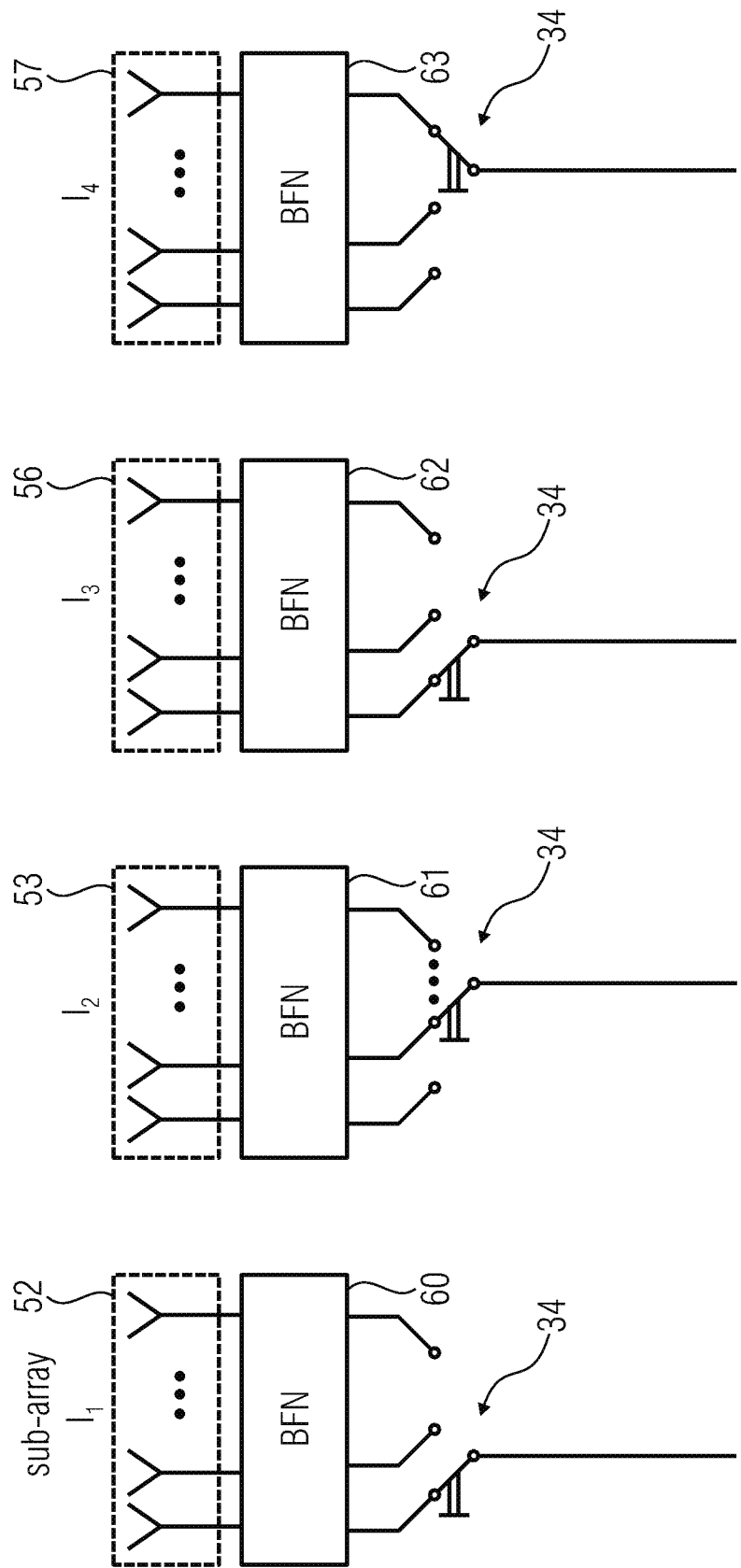
FIG. 19a shows a block diagram of an antenna apparatus using a combination of four beams of four different sub-arrays with only a single port per beam forming network being selected.
Figure 19B:
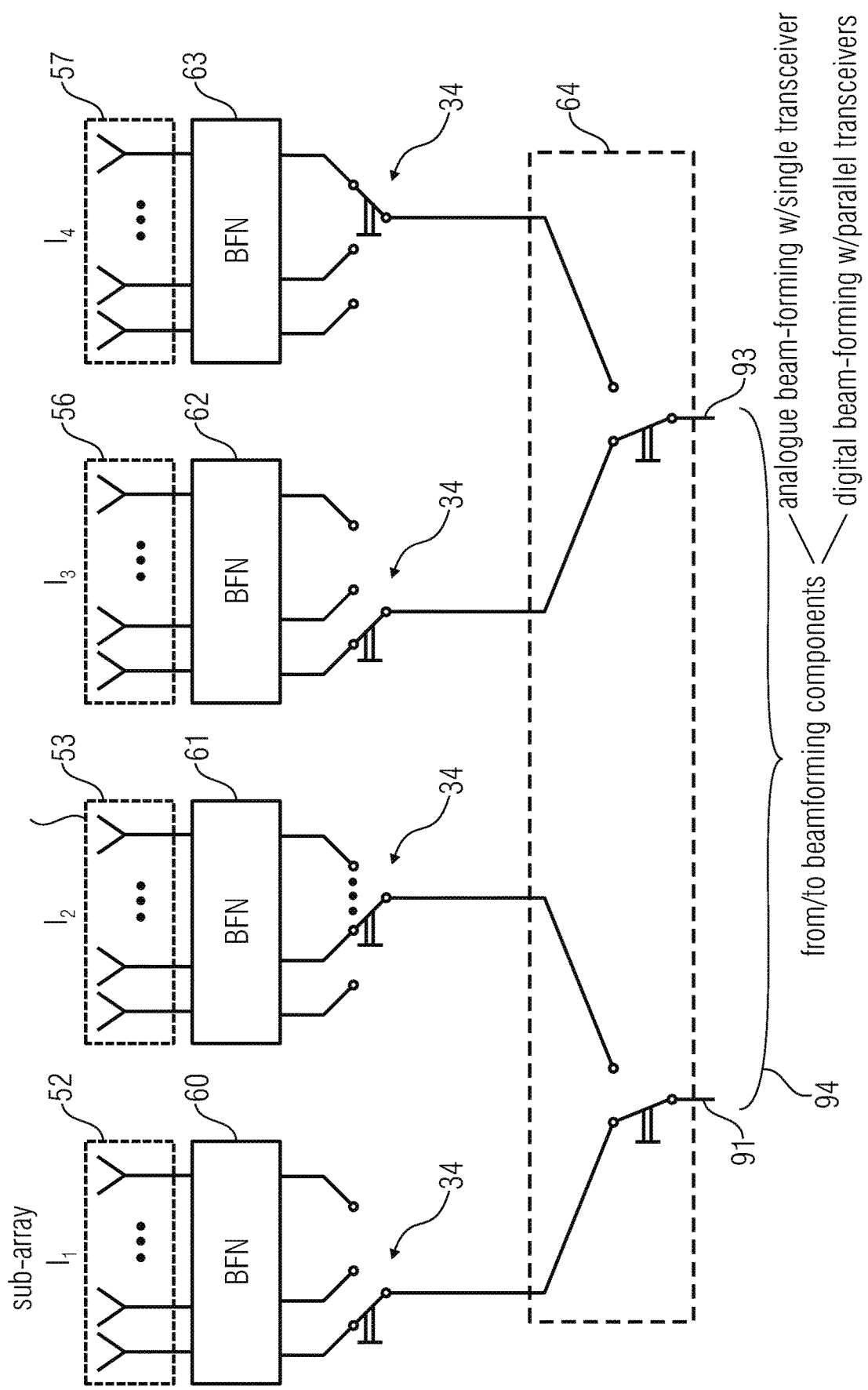
FIG. 19b shows a block diagram of the antenna apparatus of FIG. 19a using a switching/combining circuit separately treating two pairs of BFMs.

Further, as will be shown with respect to FIG. 19b, the switching/combination circuit 64 may merely operate as a switch connecting either one of BFN 60 and 62 with the common signal interface of circuit 64. Consider that a usual switched BFN handling the same number of antennas and providing the same number of states namely the sum of the number of BFN 60's and the number of BFN 62's states, would necessitate an even higher number of delay/amplitude paths to be designed and implemented.

Even alternatively, the constellation of antenna positions may be different between sets 52 and 56 similar to the description of FIG. 6. Even further, the constellation of antenna positions and association of antennas to antenna interfaces may be equal to each other for both pairs of antenna arrays and beam forming networks 52/60 and 56/62, with however the beam forming networks 60 and 62 being designed differently so as to result in disjoint, i.e. non-overlapping, sets of beam directions.

As described with respect to FIG. 7, the beam directions resulting from beam forming network 60 and the beam directions resulting from beam forming network 62 may be interleaved in the manner described with respect to FIG. 7 so that an interpolation by both beams may be achieved equally over the spanned solid state angle region 42. In transferring the description brought forward above with respect to the embodiments of FIGS. 2 to 8 onto to the embodiment of FIG. 9a, the beam directions obtained by beam forming network 60 in conjunction with antenna set 52 is to be associated with the set of beam directions of one connecting state, while the beam directions resulting from beam forming network 62 in conjunction with the associated antenna set 56 corresponds to the beam directions of another connecting state.

Although not specifically indicated above, the antennas of the above embodiments may be positioned as to have a mean pitch lying, for example, between 1 tenth and ten times an operating radiation wavelength for which the antenna apparatus. This is especially true for the mean pitch of the mean pitches of the sets of antennas together connected to one BFN. This, mean pitch may by, for example, between 1 mm and 30 cm, both inclusively.

Thus, differently speaking, the above embodiments are based on a combination of radiation characteristics of sub-arrays, each being connected to a fixed beam forming network. The terms "fixed beam forming network" and "beam forming network" are used interchangeably hereinafter unless otherwise stated.

In the following, implementation of the above described embodiments are discussed in more detail in order to provide the above embodiments with additional details and detailed features using which the above embodiments could be further developed.

Figure 10:
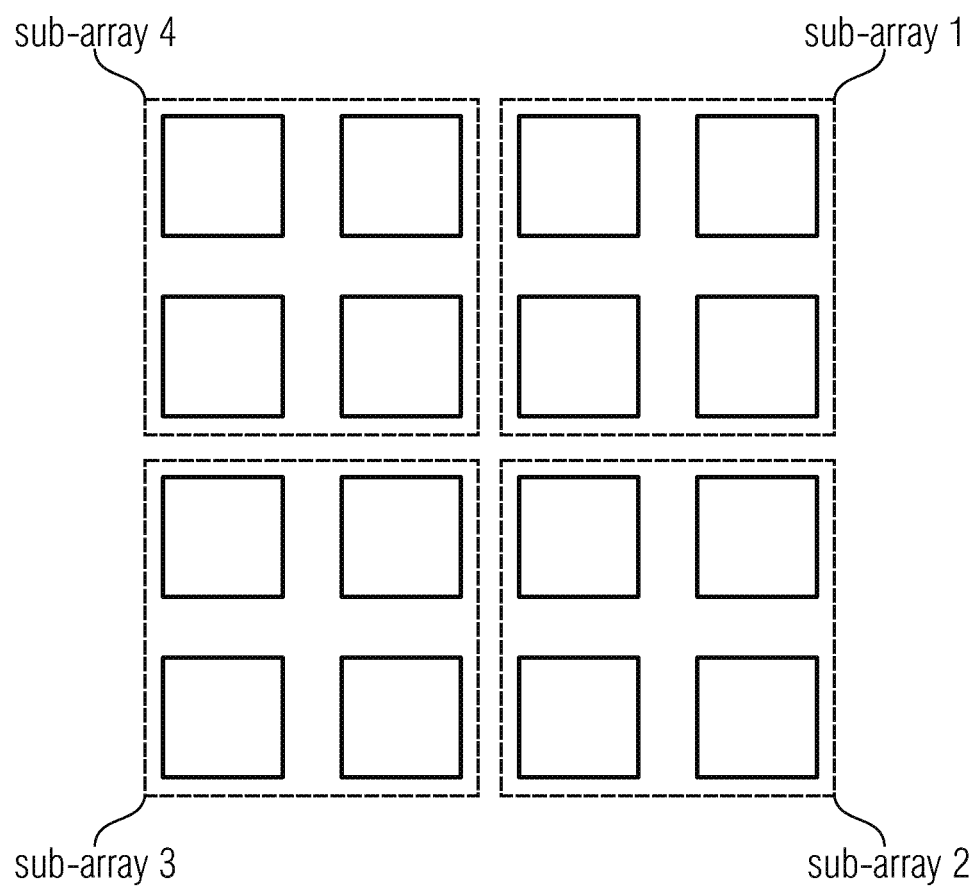
FIG. 10 shows a plan view of an antenna array exemplary 4×4 antenna elements divided into four sub-arrays of 2×2 antenna arrays.

In the embodiment shown in FIG. 10, an array of antennas is shown which could form the antenna array 23, the combination of antenna arrays 23₁/23₂ and the combination of antenna sets 52 and 56. The antenna array of FIG. 10 is divided into N sub-arrays with N>3 of two or more elements each. The antennas are illustrated in FIG. 10 using squares or continuous lines. Technically, the antennas in a whole and in the individual sub-array can be arbitrarily arranged and can be of arbitrary shape. The sub-arrays are indicated in FIG. 10 using dashed lines. They correspond to the disjoint sets of antennas connected to the antenna interfaces of the beam forming network in case of the embodiments of FIGS. 2 to 8 and the antenna sets 52 and 56 in case of the embodiment of FIG. 9a, wherein the latter may, as outlined below, be extended to comprise more than two parallel paths of antenna sets and beam forming networks. FIG. 10 shows an example of an array of 4×4 elements, which is divided into four equally sized sub-arrays composed of 2×2 antennas each.

Figure 11:
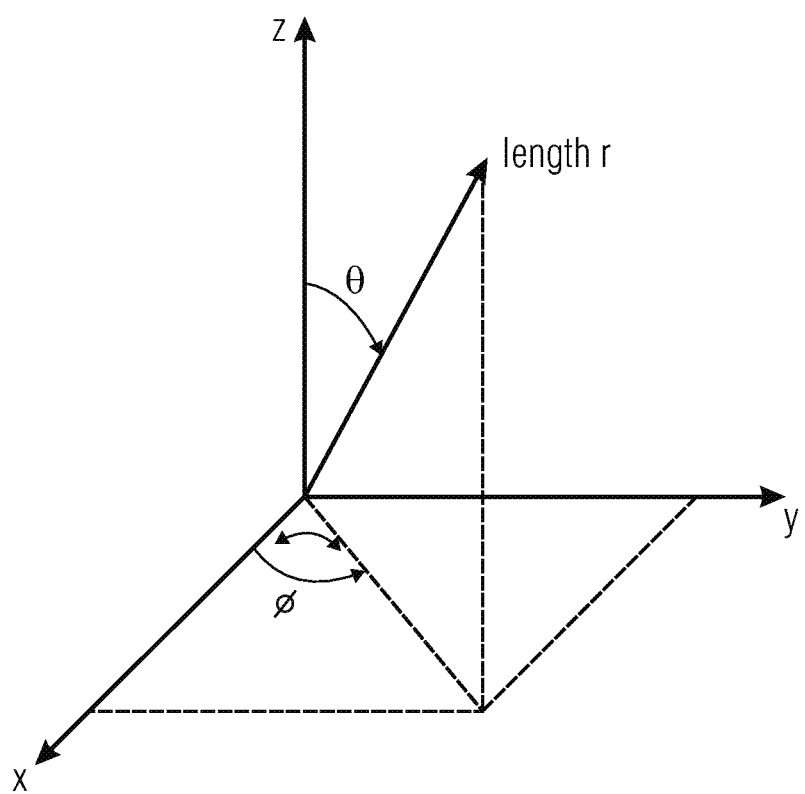
FIG. 11 shows a schematic diagram illustrating the definition of spherical coordinates used for the explanation of embodiments.
Figure 12:
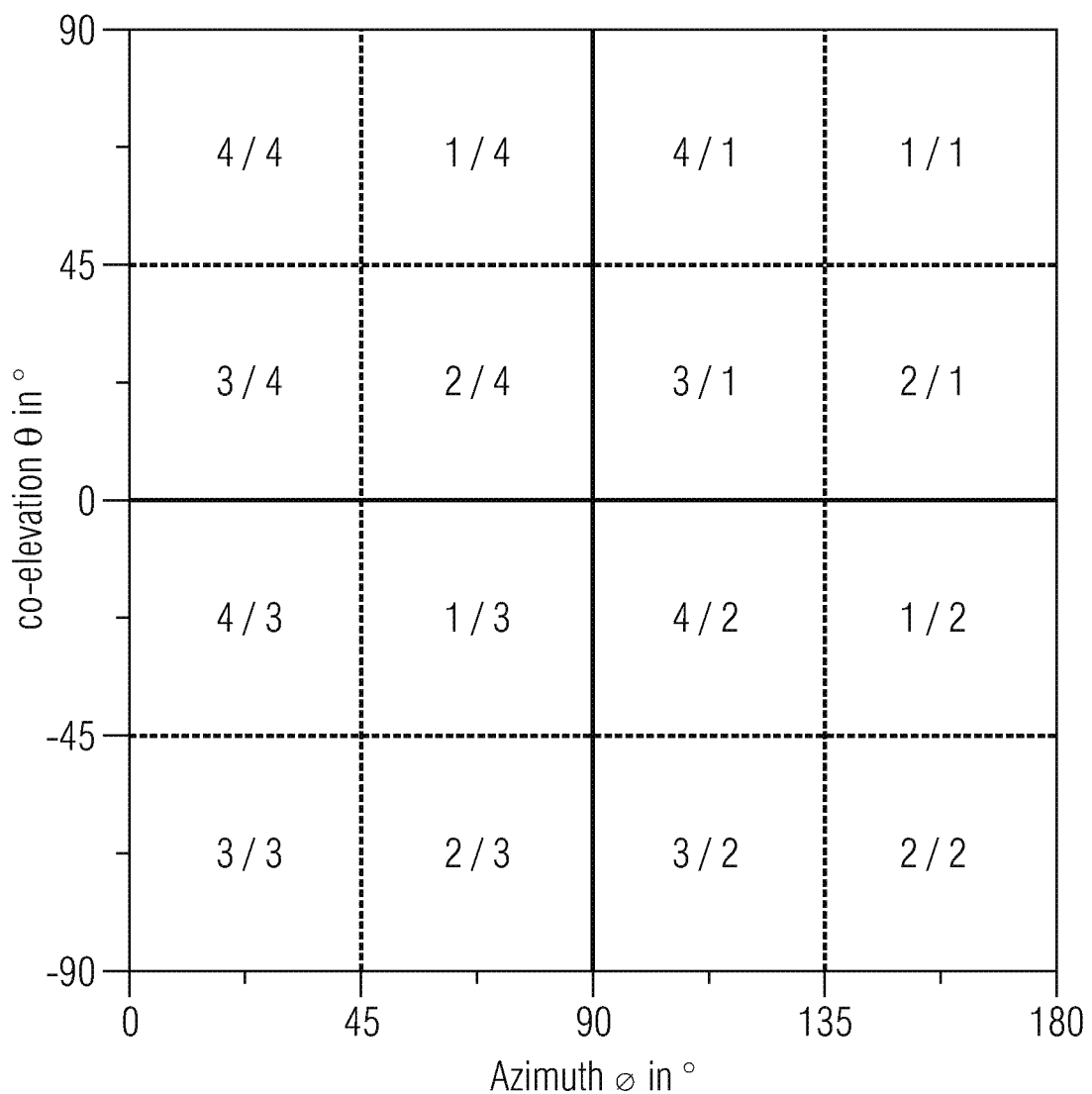
FIG. 12 illustrates an exemplary sectioning of the solid state angle region such as the upper hemisphere, assuming m=4 beams per sub-array (sections according to solid lines) and N=4 sub-arrays (sub-sections according to dotted lines), the sectioning being 2-dimensionally indicated in a coordinate system horizontally plotting the azimuth angle in degree and vertically plotting the elevation angle in degrees.

Each sub-array provides a certain number of radiation characteristics or beams M with M>1. The beams are distributed amongst the coverage region of interest, i.e., the field of view. In the above description, this coverage region of interest has been denoted by reference sign 42. The distribution is performed by dividing the field of view into m sections (compare 44 in FIG. 7). Each section comprises one beam of each sub-array, i.e. each section is consequently divided into N sub-sections. Each sub-section corresponds with one of the M beams provided by one of the N sub-arrays. The beams are distributed in such way that the beams of adjacent sub-sections all stem from another sub-array, i.e. each sub-array contributes only one beam to one section. Suppose the spherical coordinate system as depicted in FIG. 11 with θ being the co-elevation angle (off-zenith angle), φ denoting the azimuth angle and r the distance to the observation point. FIG. 12 portrays an example of a field of view covering the upper hemisphere, i.e. θ=−90° . . . 90° and φ=0° . . . 180°, that is divided into four sections each, in turn, further divided into four sub-sections. The sections are the four quarters, while the sub-sections are indicated by dotted lines. Each sub-section is identified by a pair of numbers, following the syntax: <no. of sub-array>/<no. of beam>. As seen, each sub-array contributes one beam to each section and adjacent sub-sections do not comprise two beams of the same sub-arrays. Another example of sectioning is portrayed in FIG. 13 with regions of unequal angular areas.

To generate a beam with a maximum in a given sub-section, each sub-array connects to a fixed beam forming network that provides the phase distribution necessitated. Suppose a beam pointing towards $(\theta_s, \phi_0)$ is desired. Let $\vec{r}_l$ be the center position of the lth element. Referring to the origin, the phase of that element then follows from $$\psi_l = \frac{2\pi}{\lambda} \vec{r}_l^T \vec{\tau} \text{ with}$$

$$\vec{\tau} = \begin{pmatrix} \cos\phi_0 \sin\theta_0 \\ \sin\phi_0 \sin\theta_0 \\ \cos\theta_0 \end{pmatrix}$$

and λ the free-space wavelength. As each sub-array is to generate M beams, the BFN of the sub-array needs to provide M sets of phase distribution according to this relation and depending on the position of the respective element. The pointing direction of the M beams follows from the sectioning of the field of view. For example, the first beam of the first sub-array points within the region defined by 45°≤θ≤90° and 135°≤φ≤180°, if the sectioning in FIG. 12 is assumed. The second beam of the first sub-array would accordingly point within the region defined by −45°≤θ≤0° and 135°≤φ≤180° and so on.

Figure 13:
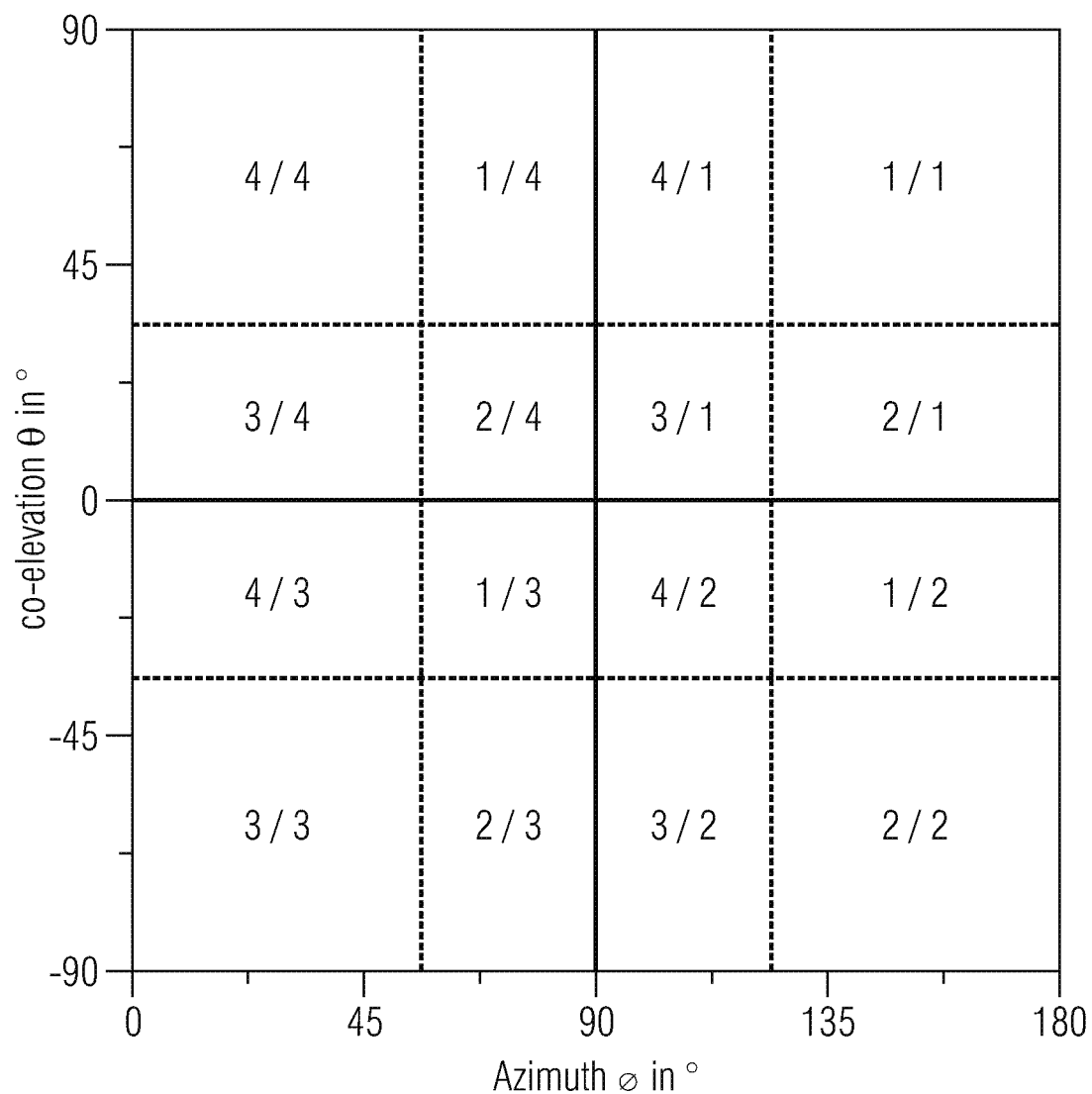
FIG. 13 illustrates an alternative example for sectioning the solid state angle region, assuming m=4 beams per sub-array and N=4 sub-arrays with differently sized angular areas.
Figure 14:
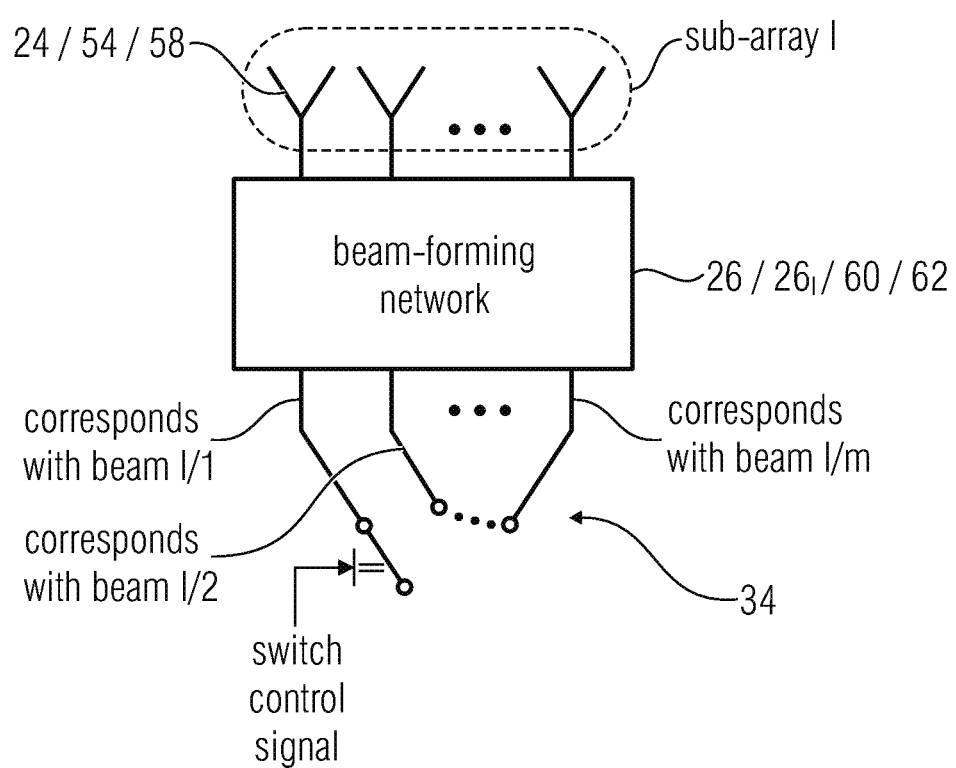
FIG. 14 shows schematically the selection of a certain beam while switching between different ports of a beam forming network which connects to an antenna sub-array.

The selection of the respective beam can be done via a switch, as illustrated in FIG. 13. The BFN allows selecting between m different phase distributions, each corresponding with a certain section and sub-section.

Figure 15:
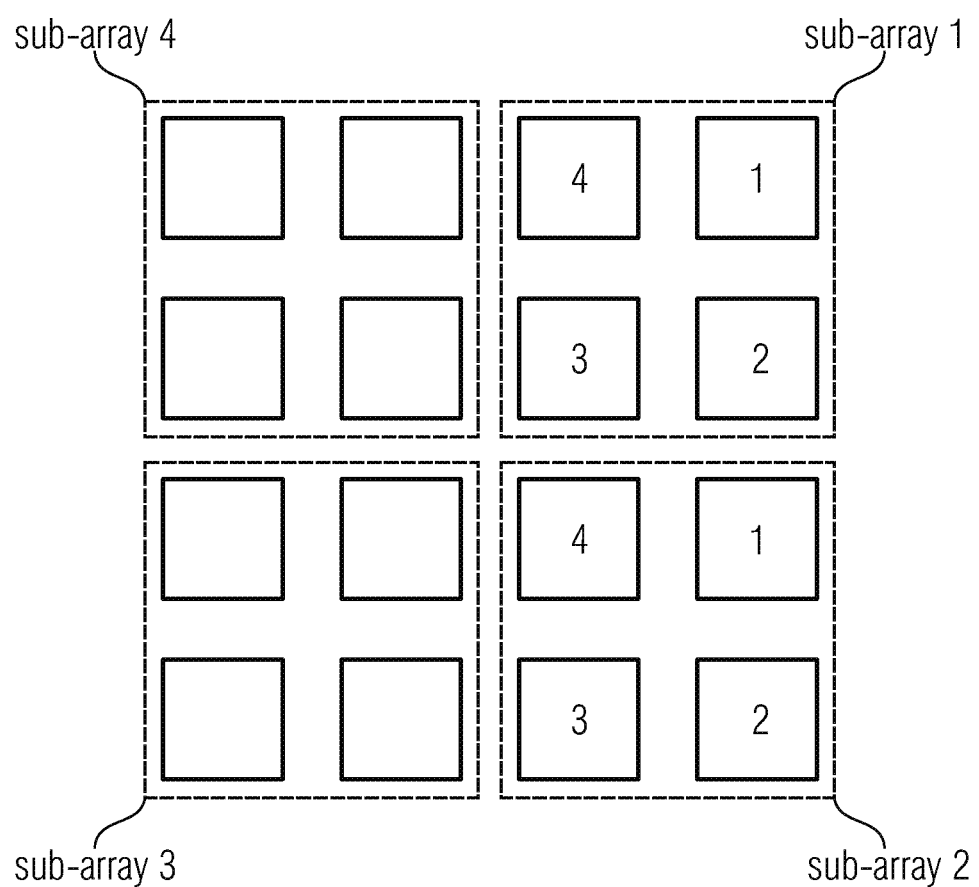
FIG. 15 shows an example of an antenna array of 4×4 antenna elements divided into four sub-arrays of 2×2 antenna elements and the numbering of antenna elements used in FIG. 16.
Figure 16:
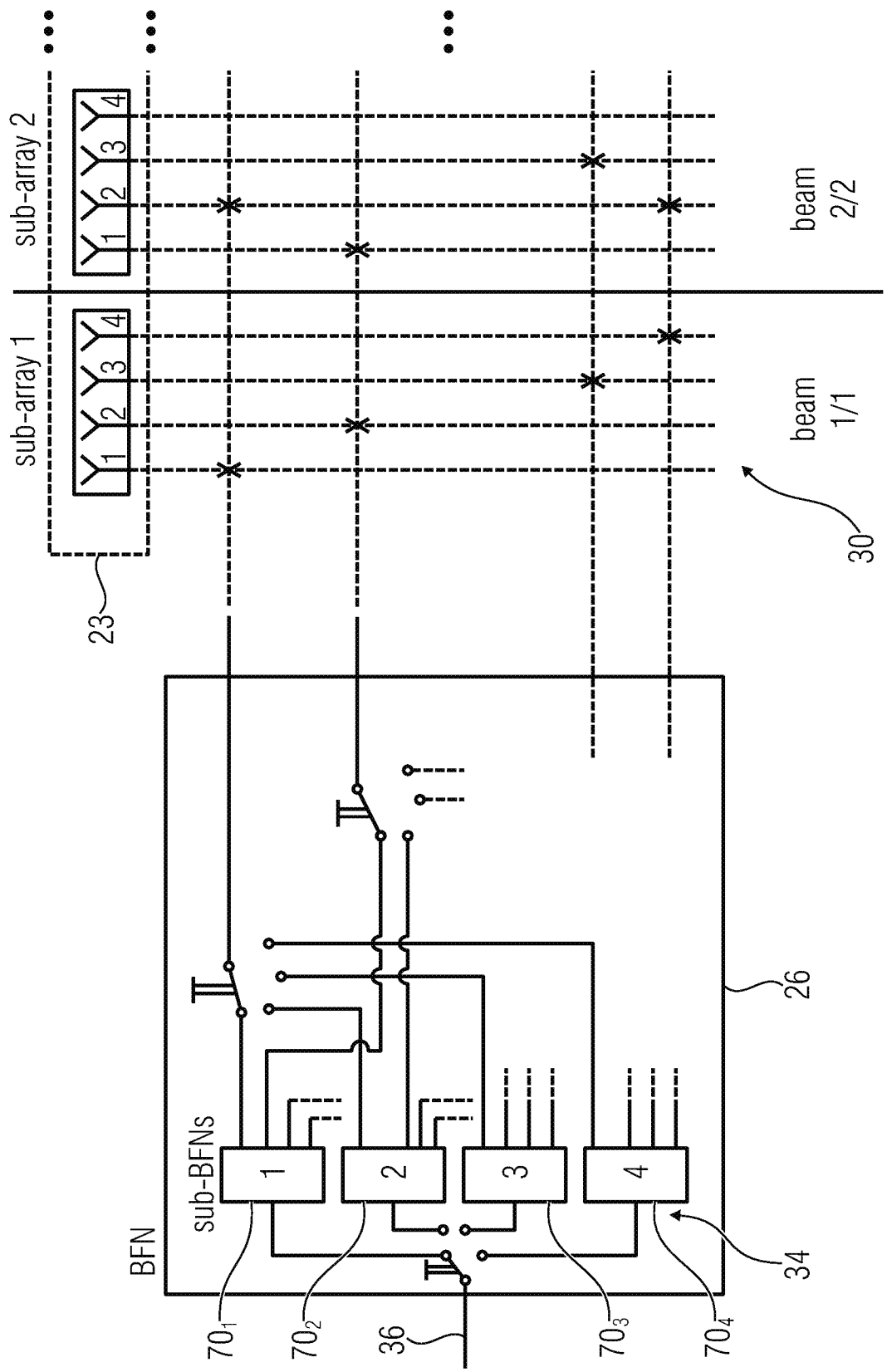
FIG. 16 shows a block diagram of an example of using one single beam forming network in connection with more than 1 sub-array of antennas as illustrated in FIG. 2 in more detail, with the single beam forming network here exemplarily being composed of four sub-BFNs and FIG. 16 also illustrates the connection of the BFN to the sub-arrays for generating beams 1/1 and 2/2 (compare FIG. 12 or FIG. 13) by properly connecting the first sub-BFN $70_1$ with the antennas of sub-array 1 for being 1/2 and sub-array 2 for being 22. The connections by the switching network are indicated by crosses.

In general, the embodiment of the BFN can be of different type and is not restricted to a limited set. This includes Butler matrices, eigenmode networks, and alike. It can also be composed of a set of M sub-BFNs, between which the selection takes place. To keep the effort low, the actual implementation might take advantage of symmetries following from the sectioning of the field of view and the arrangement of the antennas and sub-arrays. Considering, for example, the sectioning shown in FIG. 12, it can be observed that the sub-sections are rotational symmetric with respect to the normal axis through θ=0° and φ=90°. In this case, a single BFN comprising four sub-BFNs is sufficient for the whole array, provided that the antennas of each sub-array can be connected via switches to each sub-BFN. An example relying on the setting and numbering shown in FIG. 15 is depicted in FIG. 16. A single BFN composed of m=4 sub-BFNs can be used to generate multiple beams amongst multiple sub-arrays. The example shows how the first sub-BFN connects to sub-array 1 for generating beam 1/1 and to sub-array 1 for generating beam 2/2 (cf. FIG. 12 or FIG. 13). The same sub-BFN can be utilized for two sub-arrays due to symmetries.

Figure 17:
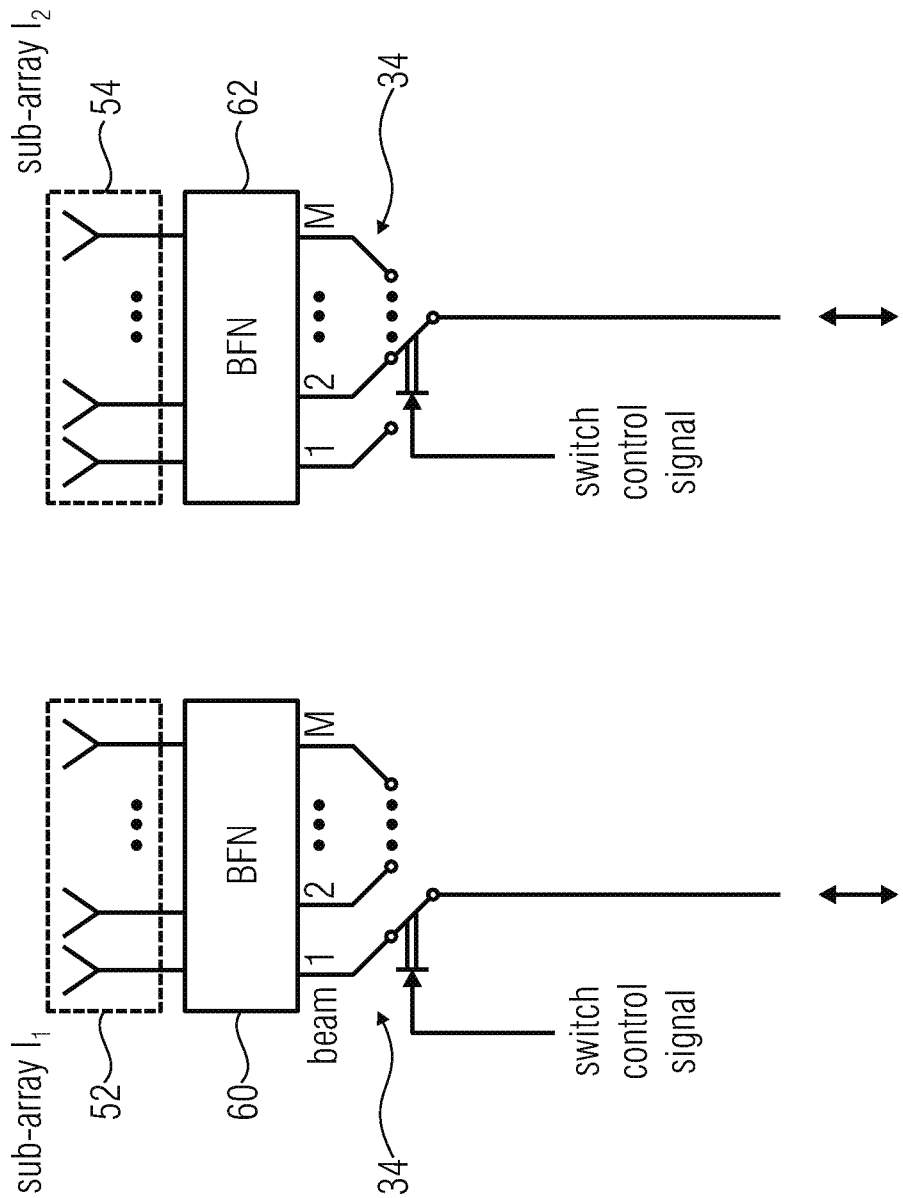
FIG. 17 shows a block diagram of an antenna apparatus using a combination of two beams of two different sub-arrays with only a single port per beam forming network being selected.

To extend the beam-forming capabilities, a combination of fixed beams can be done. FIG. 17 illustrates the concept by example of a combination of two beams of two different sub-arrays. This is easily possible because of the sectioning scheme mentioned above. If adjacent beams are generated by one sub-array, a combination of adjacent beams would necessitate a switch matrix to be able to connect both signal branches to each BFN and sub-BFN, leading to an expensive implementation.

Figure 18:
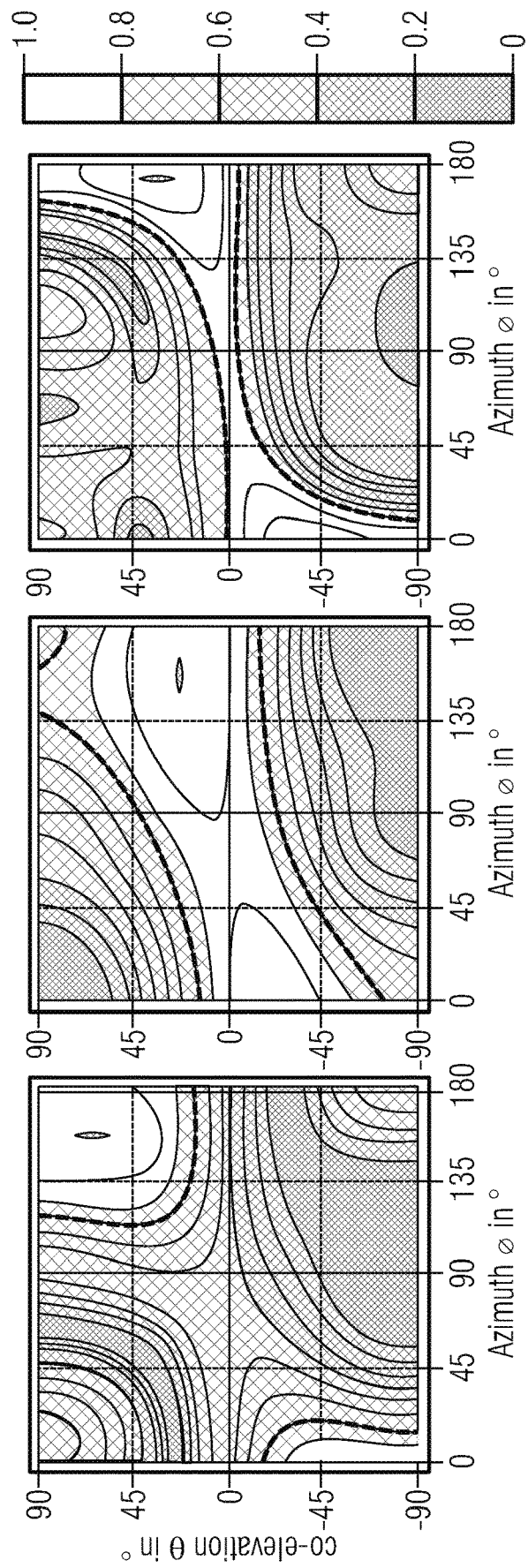
FIG. 18 shows example radiation patterns of a 4×4 antenna array with an inter-element spacing of 0.4 wavelengths with the left radiation pattern corresponding to beam 1 of sub-array 1 (beam 1/2, the center radiation pattern corresponding to beam 1 of sub-array 2 (beam 2/1), and the radiation pattern in the right hand side corresponding to a combination of both beams by simple summation, wherein all diagrams show a contour plot of the array factor, normalized to its maximum.

The combination of beams can follow several schemes. FIG. 18 shows the two individual beams 1/1 and 2/1 and the result of a simple summation of them for the example array in FIG. 10 with inter-element spacing of 0.4 wavelengths and the sectioning in FIG. 12. Beside the simple summation, a beam can be generated of a weighted sum of both individual beams. The signal of one branch needs therefore to be shifted in phase and/or amplitude by means of an analogue tunable phase and/or amplitude shifter or a digital operation applied to the baseband signal. The latter necessitates a second signal branch from the antenna to baseband. Considering the alternative of a fully steerable implementation using one branch per element, however, a considerable reduction of the number of signal branches can be achieved.

Figure 19D:
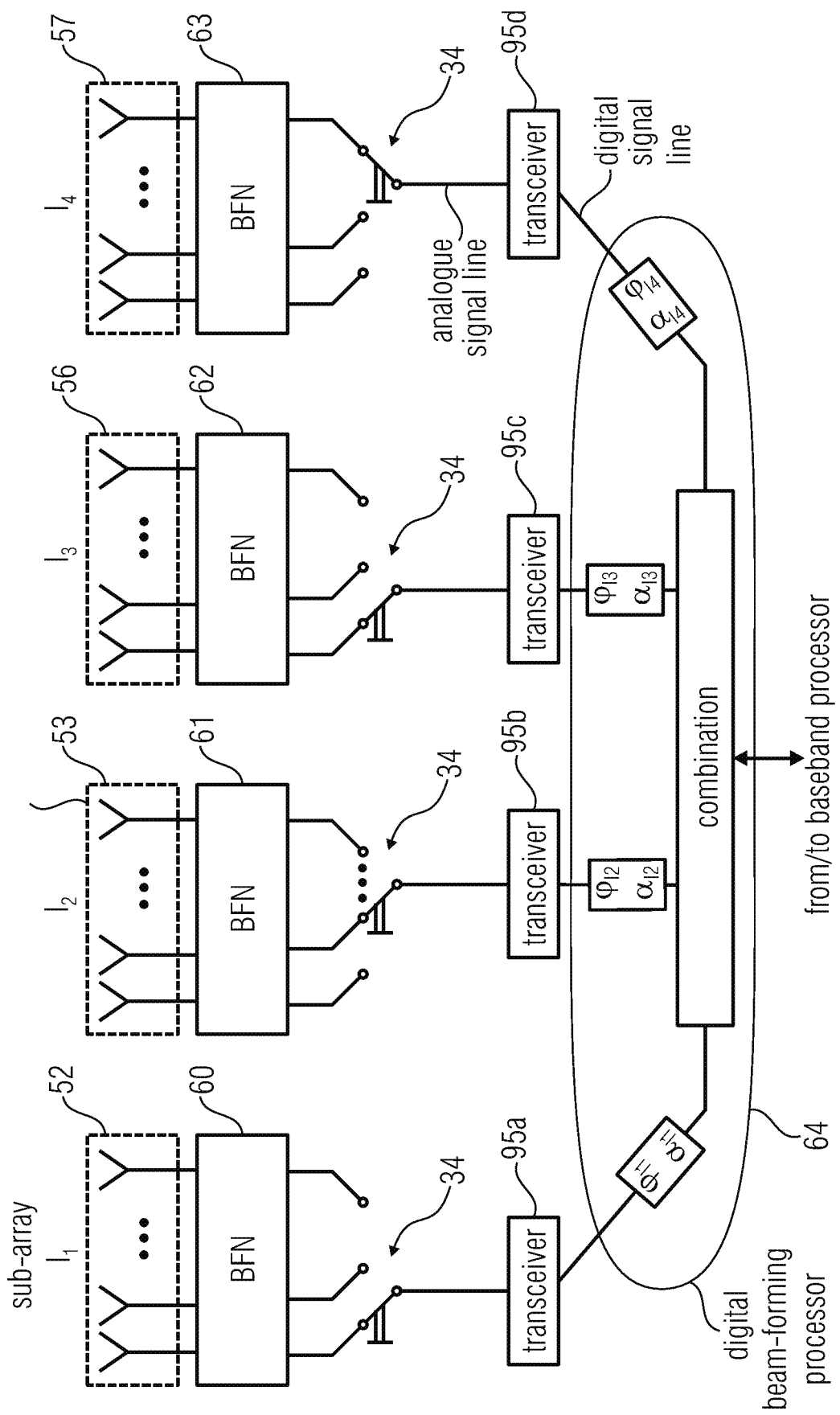
FIG. 19d shows a block diagram of the antenna apparatus of FIG. 19a using a switching/combining circuit embodied as a BFN operating in the digital domain.

The number of combined beams can be extended to the number of sub-arrays. I.e., the number of signal branches equals N. This can be considered the maximum number of branches and is still lower than compared to a fully steerable implementation with one branch per element. FIG. 19*a* shows an example architecture for combination of four beams stemming from four different sub-arrays. FIG. 19*b* shows the apparatus as comprising the switching/combination circuit 64 with here, however, separately performing the switching/combining with respect to BFNs 60 and 61 so as to unify them with respect to a first common signal interface 91 of the switching/combination circuit 64 and BFNs 62 and 63 so as to unify them with respect to a second common signal interface 93 of the switching/combination circuit 64, respectively. Between these two common signal interface 91 and 93 another switching/combining circuit could be positioned performing the switching/combining like FIG. 9*e* in the digital domain using two parallel transceivers (or merely two parallel receive stages or merely two transmit stages) connected in front of the common signal interface 91 and 93, or like FIG. 9*d* in the analogue domain using one transceiver (or merely two parallel receive stages or merely two transmit stages) connected to the one signal interface of that another switching/combining circuit, which faces away from the circuit 64. The switching/combining circuit 64 could be implemented here as merely switching between connecting either one of BFNs 60 and 61 to interface 91 and connecting either one of BFNs 62 and 63 to interface 92, respectively, while the optional further switching/combining circuit which is merely illustrated using a brace 94, could perform a combination of both interfaces 91 and 92 using different phases and amplitudes with respect to a single signal interface in the sense of a beam forming, for example. FIG. 19*c* illustrates the switching/combining circuit 64 as a tunable analogue beam-forming network comprising phase shifters and/amplitude shifters along with an analog combination module so as to couple the signal interfaces of BFNs 60, 61, 62 and 63 with the wanted phases delays and amplitude factors with one signal interface which then may be connected to a transceiver (or receive or transmit) stage. FIG. 19*d* illustrates the switching/combining circuit 64 as achieving the same coupling of the signal interfaces of BFNs 60, 61, 62 and 63 with the wanted phases delays and amplitude factors with one signal interface which then may be connected to a transceiver (or receive or transmit) stage, but in the digital domain, with transceivers (merely receive or transmit stages may be used instead) 95*a-d* being connected between BFNs 60 to 63 and circuit 64, respectively.

Figure 19E:
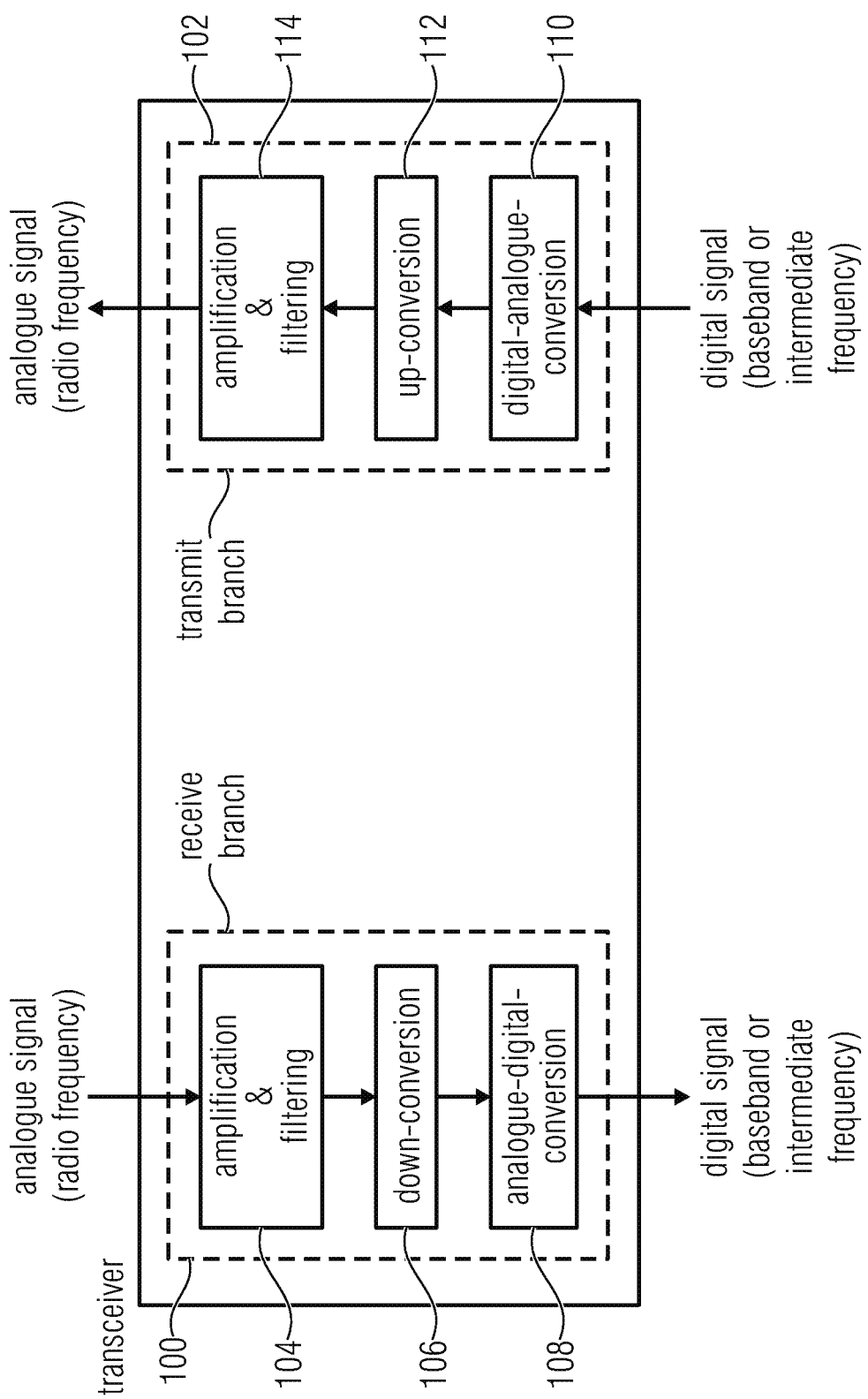
FIG. 19e shows a block diagram of a transceiver in accordance with an embodiment.1, the baseband processor is number "16".

For sake of completeness, FIG. 19*e* shows an example for a transceiver which may be used for the above-mentioned transceivers. Same comprises a receive branch 100 which, in turn, may be used for any of the above-mentioned receive stages and a transmit stage 102 which may be used for any of the above-mentioned transmit stages. The first one comprises a concatenation of an amplifier/filter stage 104, down-converter 106 and A/D-converter 108 so as to convert a analogue receive signal in radio frequency from the antenna side and output a digital signal in a baseband or intermediate frequency, and the latter one comprises a concatenation of a D/A-converter 110, an up-converter 112 and an amplifier/filter stage 114, so as to convert a digital signal in baseband or intermediate frequency into an analogue signal at radio frequency to be output towards the antenna side.

The separation of the antenna array into sub-arrays with a fixed BFN per sub-array and only one beam selected per BFN has the following advantages:

a) The number of ports connecting to the receiver/transmitter reduces to the number of sub-arrays. This leads to less effort in the implementation, as the number of sub-arrays limits the maximum number of signal branches necessitated.

b) The beams of different sub-arrays can be combined.
  i) The number of beams combined can be extended to the number of sub-arrays.
  ii) The combination can be done by a weighted sum of the beams. The switchable fixed beam-forming can therefore be combined with a tunable beam-forming. Due to the pre-defined fixed beams, the tuning range of steerable beam-forming elements such as phase shifters can be considerably reduced compared to a fully steerable beam-forming network, whose phase shifters have to cover a tuning range of 360°. In case of an analogue phase shifter, the design effort is clear reduced and lower losses and, therefore, higher system performance can be achieved.

c) A fixed BFN is less prone to losses than an analogue phase shifter. This holds also for configuration for combination of beams of sub-arrays by a switch or using a signal branch per sub-array. A higher system performance can therefore be achieved.

d) A fixed BFN has higher power handling capabilities and shows a higher linearity than an analogue phase shifter. This holds also for the configuration for combination of beams of sub-arrays by a switch or using a signal branch per sub-array. Analogue phase shifters often rely on semiconductor devices such as diodes or transistors. These show usually low linearity, as their characteristics vary with the RF signal.

e) The antenna can be arbitrarily arranged.

A Butler matrix implies an equidistant arrangement of antennas.

The sectioning of the field of view with each section comprising N sub-sections and beams of adjacent sub-sections stem from different sub-arrays has the following advantages:

a) The combination of beams can be easily implemented via a switch at each BFN that selects only a single BFN port. In case of adjacent sub-sections corresponding to beams of one sub-array, the combination would necessitate a switch matrix, usually a cost-intensive component.

b) The sectioning can be done in a symmetric manner.
   i) The fixed BFNs of the sub-arrays can therefore be implemented based on a common reference BFN design. The BFN of a certain sub-array can be deduced from the reference BFN by applying symmetry operations to it. This reduces the design effort and the design period.
   ii) A single BFN comprising N sub-BFNs can be used for the whole array. Each sub-array is connected to one of the sub-BFNs, while each sub-BFN is used once at an instant of time. This reduces the design effort and the design period.

Potential uses for the above embodiments are, for example,

1) Satellite communication, especially beam forming and tracking for moving receivers or transmitters.
2) Other communication systems (including mobile phones, wireless local area networks, etc.) that benefit from improved antenna gain and/or directivity.

With respect to the above figures it is noted that several modifications may be performed. For example, while reflections where used in FIG. 4a and other embodiments so as to multiplicate the representable number of beam directions despite using one or symmetric BFNs, rotation may be used as well. Although not specifically mentioned above, FIG. 3 is an example for a BFN which could be used for any BFN of any embodiment, just as FIG. 19e shows an example for a transceiver (and a transmit/receive stage) which could also be used for any of the embodiments. Further, "fixedly preconfigured" shall be understood to denote, for example, the absence of tunable analogue devices such a tunable delays and/or tunable couplers or the like, and/or the hard-wired implementation of the respective beam forming states using non-tunable analogue devices.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An antenna apparatus supporting adjustability of an antenna beam direction, comprising
    an antenna array of antennas;
    a beamforming network comprising M antenna interfaces and being switchable between m fixedly preconfigured beamforming states so as to couple the M antenna interfaces at different mutual phase and/or amplitude variations, and
    a switching network switchable between N different connecting states, wherein the switching network is configured to, in each connecting state, connect the M antenna interfaces with a set of M antennas of the antenna array such that relative positions of the M antennas connected to the M antenna interfaces in the respective connecting state, differ among the N connection states,
    wherein the switching network is configured such that the sets of M antennas connected to the M antenna interfaces in the N connecting states, are mutually disjoint,
    wherein the switching network is configured such that the sets of M antennas connected to the M antenna interfaces in the N connecting states, with N>2, are positioned at lattice sites of mutually congruent two-dimensional lattices lying in a common plane.

2. The antenna apparatus according to claim 1, wherein the antenna apparatus is configured to adjust the direction of the wireless direction within a hemisphere.

3. The antenna apparatus according to claim 1, wherein the beam forming network comprises m signal interfaces, each of which corresponding to a respective one of the m fixedly preconfigured beamforming states and coupled, at antenna-interface-individual phase delay and amplitude factor which are specific for the respective fixedly preconfigured beam forming state, to the M antenna interfaces, so that the beam forming network is switchable by changing the signal interface via which the beam forming network is operated.

4. The antenna apparatus according to claim 3, further comprising a switching circuit configured to connect exactly one of the m signal interfaces with a receiver and/or transmitter circuit.

5. The antenna apparatus according to claim 1, wherein the beam forming network is configured such that, for each of the N connecting states, the m fixedly preconfigured beam forming states result in a set of m different beam directions which are asymmetrically distributed with respect to a normal of the common plane.

6. The antenna apparatus according to claim 5, wherein the sets of m different beam directions of the N connecting states are interleaved so that a solid state angle region spanned by the sets of m different beam directions of the N connecting states may be partitioned into N sections so that in each section exactly one beam direction of each of the sets of m different beam directions of the N connecting states is.

7. The antenna apparatus according to claim 1, wherein the antenna apparatus is controllable with respect to which of the m fixedly preconfigured beamforming states the beamforming network assumes and which of the N different connecting states the switching network assumes, thereby resulting in m×N control states of the apparatus, each of which is associated with a different beam direction of the wireless channel.

8. An antenna apparatus supporting adjustability of an antenna beam direction, comprising
    an antenna array of antennas;
    a beamforming network comprising M antenna interfaces and being switchable between m fixedly preconfigured beamforming states so as to couple the M antenna interfaces at different mutual phase and/or amplitude variations, and
    a switching network switchable between N different connecting states, wherein the switching network is configured to, in each connecting state, connect the M antenna interfaces with a set of M antennas of the antenna array such that relative positions of the M antennas connected to the M antenna interfaces in the respective connecting state, differ among the N connection states, wherein the positions of the M antennas connected to the M antenna interfaces in the N connection states, with N>2, are lattice sites of mutually congruent two-dimensional lattices and mutually transferrable to each other by isometry operations.

9. The antenna apparatus according to claim 8, wherein the beam forming network is configured such that, for each of the N connecting states, the m fixedly preconfigured beam forming states result in a set of m different beam directions which is non-invariant against the isometric operations.

10. An antenna apparatus supporting adjustability of an antenna beam direction, comprising
an antenna array of antennas;
a beamforming network comprising M antenna interfaces and being switchable between m fixedly preconfigured beamforming states so as to couple the M antenna interfaces at different mutual phase and/or amplitude variations,
a switching network switchable between N different connecting states, wherein the switching network is configured to, in each connecting state, connect the M antenna interfaces with a set of M antennas of the antenna array such that relative positions of the M antennas connected to the M antenna interfaces in the respective connecting state, differ among the N connection states,
a further antenna array of further antennas;
a further beam forming network comprising M' further antenna interfaces and being switchable between m' fixedly preconfigured beamforming states so as to couple the M' further antenna interfaces at different mutual phase and/or amplitude variations;
a further switching network switchable between at least N' different connecting states, wherein the further switching network is configured to, in each connecting state, connect the M' antenna interfaces with a set of M' further antennas of the further antenna array such that relative positions of the M' further antennas connected to the M' further antenna interfaces in the respective connection state, differ among the N' connection states; and
a controllable combination circuit configured to couple, at a controllable manner, a signal interface of the beam forming network and a further signal interface of the further beam forming network so that the antenna beam direction results from a combination of beams of the antenna array and the further antenna array.

11. An antenna apparatus supporting adjustability of an antenna beam direction, comprising
an antenna array of antennas comprising a first set of antennas and a second set of antennas;
a first beam forming network connectable to the first set of antennas and being switchable between fixedly preconfigured beam forming states so as to couple the first set of antennas at different mutual phase and/or amplitude variations,
a second beam forming network connectable to the second set of antennas and being switchable between fixedly preconfigured beam forming states so as to couple the second set of antennas at different mutual phase and/or amplitude variations,
wherein the m fixedly preconfigured beam forming states of the first beam forming network result in a first set of different beam directions which is disjoint to a second set of different beam directions resulting from the fixedly preconfigured beam forming states of the second beam forming network,
wherein the first and second sets of antennas each comprise M antennas and the first and second beam forming networks each comprising M antenna interfaces and m signal interfaces, each of which corresponding to a respective one of m fixedly preconfigured beamforming states and coupled, at antenna-interface-individual phase delay and amplitude factor which are specific for the respective fixedly preconfigured beam forming state, to the M antenna interfaces, so that the first and second beam forming networks are switchable by changing the signal interface via which the first and second beam forming network are operated, respectively, wherein the at antenna-interface-individual phase delay and amplitude factor which are specific for the each of the m fixedly preconfigured beam forming state are equal between the first and second beam forming networks.

12. The antenna apparatus according to claim 11, wherein the antenna apparatus is configured to adjust the direction of the wireless direction within a hemisphere.

13. The antenna apparatus according to claim 11, wherein the first and second set of antennas are connected to the M antenna interfaces so that a set of beam directions resulting from the m fixedly preconfigured beamforming states of the first beam forming network are transformable onto a set of beam directions resulting from the m fixedly preconfigured beamforming states of the second beam forming network by reflection and/or rotation.

14. The antenna apparatus according to claim 11, wherein the first and second set of antennas lie in a common plane.

15. An antenna apparatus supporting adjustability of an antenna beam direction, comprising
an antenna array of antennas comprising a first set of antennas and a second set of antennas;
a first beam forming network connectable to the first set of antennas and being switchable between fixedly preconfigured beam forming states so as to couple the first set of antennas at different mutual phase and/or amplitude variations,
a second beam forming network connectable to the second set of antennas and being switchable between fixedly preconfigured beam forming states so as to couple the second set of antennas at different mutual phase and/or amplitude variations,
wherein the m fixedly preconfigured beam forming states of the first beam forming network result in a first set of different beam directions which is disjoint to a second set of different beam directions resulting from the fixedly preconfigured beam forming states of the second beam forming network,
wherein a first set of beam directions resulting from the m fixedly preconfigured beamforming states of the first beam forming network and a second set of beam directions resulting from the m fixedly preconfigured beamforming states of the second beam forming network are interleaved so that a solid state angle region spanned by the first and second sets of beam directions may be partitioned into sections so that in each section exactly one beam direction of each of the first and second sets of beam directions is.

16. An antenna apparatus supporting adjustability of an antenna beam direction, comprising
an antenna array of antennas comprising a first set of antennas and a second set of antennas;
a first beam forming network connectable to the first set of antennas and being switchable between fixedly preconfigured beam forming states so as to couple the first set of antennas at different mutual phase and/or amplitude variations, a second beam forming network connectable to the second set of antennas and being switchable between fixedly preconfigured beam forming states so as to couple the second set of antennas at different mutual phase and/or amplitude variations, wherein the m fixedly preconfigured beam forming states of the first beam forming network result in a first set of different beam directions which is disjoint to a second set of different beam directions resulting from the fixedly preconfigured beam forming states of the second beam forming network, wherein the antenna apparatus is controllable with respect to which of the fixedly preconfigured beamforming states the first beamforming network assumes and which of the fixedly preconfigured beamforming states the second beamforming network assumes, wherein the antenna apparatus further comprises a controllable combining circuit configured to couple—at selectable delay and/or amplitude difference—signal interfaces of the first and second beam forming networks to a common signal interface.

17. The antenna apparatus according to claim 16, wherein the controllable combining circuit is configured to perform the coupling in digital or analogue domain.

18. The antenna apparatus according to claim 16, wherein the controllable combining circuit is implemented as a beam forming network.

19. A method supporting adjustability of an antenna beam direction using an antenna array of antennas, the method using a beamforming network comprising M antenna interfaces and being switchable between m fixedly preconfigured beamforming states so as to couple the M antenna interfaces at different mutual phase and/or amplitude variations, the method comprising switching between N different connecting states, wherein, in each connecting state, the M antenna interfaces are connected with a set of M antennas of the antenna array such that relative positions of the M antennas connected to the M antenna interfaces in the respective connecting state, differ among the N connection states, wherein the method further uses a further antenna array (232) of further antennas and a further beam forming network (262) comprising M' further antenna interfaces and being switchable between m' fixedly preconfigured beamforming states so as to couple the M' further antenna interfaces at different mutual phase and/or amplitude variations, wherein the method further comprises switching between at least N' different connecting states, wherein, in each connecting state, the M' antenna interfaces are connected with a set of M' further antennas of the further antenna array such that relative positions of the M' further antennas connected to the M' further antenna interfaces in the respective connection state, differ among the N' connection states; and coupling, at a controllable manner, a signal interface of the beam forming network and a further signal interface of the further beam forming network so that the antenna beam direction results from a combination of beams of the antenna array and the further antenna array.

20. A method supporting adjustability of an antenna beam direction using an antenna array of antennas, the method using an antenna array of antennas comprising a first set of M antennas and a second set of antennas, a first beam forming network connectable to the first set of antennas and being switchable between fixedly preconfigured beam forming states so as to couple the first set of antennas at different mutual phase and/or amplitude variations, a second beam forming network connectable to the second set of antennas and being switchable between fixedly preconfigured beam forming states so as to couple the second set of antennas at different mutual phase and/or amplitude variations, wherein the fixedly preconfigured beam forming states of the first beam forming network result in a first set of different beam directions which is disjoint to a second set of different beam directions resulting from the fixedly preconfigured beam forming states of the second beam forming network, wherein the method comprises controlling with respect to which of the fixedly preconfigured beamforming states the first beamforming network assumes and which of the fixedly preconfigured beamforming states the second beamforming network assumes, and coupling—at selectable delay and/or amplitude difference—signal interfaces of the first and second beam forming networks to a common signal interface.

* * * * *